US008527514B2

(12) United States Patent
Sakuma et al.

(10) Patent No.: US 8,527,514 B2
(45) Date of Patent: Sep. 3, 2013

(54) APPARATUS FOR CONNECTING GETTING-IN RECORD AND GETTING-OFF RECORD OF VEHICLE, AND METHOD OF THE SAME

(75) Inventors: Yasushi Sakuma, Chita-gun (JP); Kazunao Yamada, Toyota (JP); Yusuke Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 13/176,175

(22) Filed: Jul. 5, 2011

(65) Prior Publication Data

US 2012/0011122 A1 Jan. 12, 2012

(30) Foreign Application Priority Data

Jul. 7, 2010 (JP) .................................. 2010-154682

(51) Int. Cl.
*G06F 17/30* (2006.01)

(52) U.S. Cl.
USPC ............ 707/737; 707/751; 707/758; 707/746

(58) Field of Classification Search
USPC .......................... 707/758, 7.31, 737, 751, 746
See application file for complete search history.

(56) References Cited

U.S. PATENT DOCUMENTS

| 7,487,918 B2 | 2/2009 | Kudo et al. | |
| 8,135,507 B2 * | 3/2012 | Okabe et al. | 701/31.4 |
| 2003/0115093 A1 * | 6/2003 | Lim et al. | 705/10 |
| 2005/0143905 A1 | 6/2005 | Yoshikawa et al. | |
| 2008/0027772 A1 * | 1/2008 | Gernega et al. | 705/7 |
| 2008/0243312 A1 * | 10/2008 | Nakamura et al. | 701/1 |
| 2010/0030434 A1 * | 2/2010 | Okabe et al. | 701/48 |
| 2010/0185486 A1 * | 7/2010 | Barker et al. | 705/10 |
| 2010/0292893 A1 | 11/2010 | Yamada et al. | |
| 2011/0264317 A1 * | 10/2011 | Druenert et al. | 701/22 |
| 2012/0277955 A1 * | 11/2012 | Irie | 701/41 |

FOREIGN PATENT DOCUMENTS

| JP | A-11-153446 | 6/1999 |
| JP | A-2006-308382 | 11/2006 |
| JP | A-2007-263972 | 10/2007 |
| JP | A-2008-213594 | 9/2008 |
| JP | A-2008-304243 | 12/2008 |

OTHER PUBLICATIONS

Office Action mailed Jun. 26, 2012 in corresponding JP Application No. 2010-154682 (and English translation).

\* cited by examiner

*Primary Examiner* — Sherief Badawi
(74) *Attorney, Agent, or Firm* — Posz Law Group, PLC

(57) ABSTRACT

An apparatus for connecting getting-in and off records of a vehicle includes: a driving information memory unit for storing getting-in and off records having a pair of getting-in and getting-off records, each of which represents a getting-in or off time and place; a grouping unit for grouping the getting-in or off records representing a same getting-in or off time zone and place, so that segmentalized getting-in or off groups are generated; a connecting unit for searching a segmentalized getting-in group connected to one segmentalized getting-off group, and for storing connection information between a searched segmentalized getting-in group and the one segmentalized getting-off group; and an estimating unit for specifying a getting-off time and a getting-off point when the getting-off action of the driver is detected, and estimating a getting-in time for a next driving according to the connection information.

8 Claims, 9 Drawing Sheets

FIG. 3

| DRI HISTORY NUM | EVENT | TIME | PLACE |
|---|---|---|---|
| 1 | GETTING IN | 8:00 | HOME |
|  | GETTING OFF | 8:30 | A COMPANY OFFICE |
| 2 | GETTING IN | 18:00 | A COMPANY OFFICE |
|  | GETTING OFF | 18:30 | HOME |
| 3 | GETTING IN | 10:00 | HOME |
|  | GETTING OFF | 10:20 | B SUPER MARKET |
| 4 | GETTING IN | 11:00 | B SUPER MARKET |
|  | GETTING OFF | 11:20 | HOME |
| 5 | GETTING IN | 8:00 | HOME |
|  | GETTING OFF | 8:30 | A COMPANY OFFICE |
| 6 | GETTING IN | 18:00 | A COMPANY OFFICE |
|  | GETTING OFF | 18:30 | HOME |
| 7 | GETTING IN | 8:00 | HOME |
|  | GETTING OFF | 8:30 | A COMPANY OFFICE |
| ... | ... | ... | ... |
| n | GETTING IN | 18:00 | A COMPANY OFFICE |
|  | GETTING OFF | 18:30 | HOME |

FIG. 4

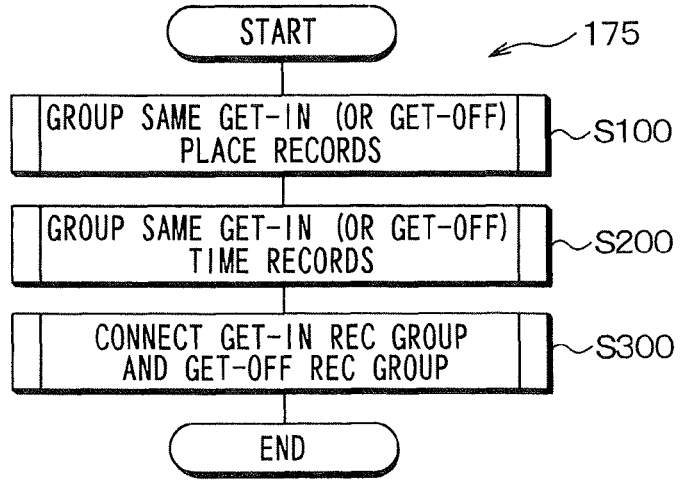

APPARATUS FOR CONNECTING GETTING-IN RECORD AND GETTING-OFF RECORD OF VEHICLE, AND METHOD OF THE SAME

CROSS REFERENCE TO RELATED APPLICATION

This application is based on Japanese Patent Application No. 2010-154682 filed on Jul. 7, 2010, the disclosure of which is incorporated herein by reference.

TECHNICAL FIELD

The present invention relates to an apparatus for connecting a getting-in record and a getting-off record of a vehicle and a method for connecting a getting-in record and a getting-off record of a vehicle.

BACKGROUND

Conventionally, a technique is well known such that various information of a driving of a vehicle is stored, and various controls are performed based on the stored information. For example, in JP-A-2008-213594, information such as an average vehicle speed in each sections in a driving route from time to turn on an engine to time to turn off the engine is stored, and the stored information is used for a driving support.

However, in the above technique, it is not clear when a driver gets in the vehicle at the next time after the driver gets off the vehicle. Specifically, it is impossible to specify a relationship between a getting-in time of the vehicle and a getting-off time of the vehicle.

SUMMARY

In view of the above-described problem, it is an object of the present disclosure to provide an apparatus for connecting a getting-in record and a getting-off record of a vehicle. It is another object of the present disclosure to provide a method for connecting a getting-in record and a getting-off record of a vehicle.

According to an example aspect of the present disclosure, an apparatus for connecting a getting-in record and a getting-off record of a vehicle includes: a driving information memory unit for storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected; a grouping unit for grouping the getting-in records, which represent a same getting-in time zone and a same getting-in place, so that one or more segmentalized getting-in groups are generated, and for grouping the getting-off records, which represent a same getting-off time zone and a same getting-off place, so that one or more segmentalized getting-off groups are generated; a connecting unit for searching a segmentalized getting-in group, which is connected to each of the one or more segmentalized getting-off groups, and for storing connection information in a getting-in and off connection data, wherein the connection information represents a connection between a searched segmentalized getting-in group and a respective segmentalized getting-off group, the connection unit searches the segmentalized getting-in group in such a manner that the connection unit specifies one segmentalized getting-in group representing a getting-in record, which is stored in the driving history data next to each getting-off record of a respective segmentalized getting-off group, and determines the one segmentalized getting-in group, which is connected to the respective segmentalized getting-off group, when the number of times that the one segmentalized getting-in group is specified is equal to or larger than predetermined times; and an estimating unit for specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time.

In the above apparatus, when the apparatus detects the getting-off action of the driver and detects the getting-off time and the getting-off place, the apparatus estimates the next getting-in time with high accuracy based on the getting-in and off connection data.

According to another example aspect of the present disclosure, a program product stored in a non-transitory computer-readable media includes instructions for execution by a computer, the instructions enabling the computer to function as the driving information memory unit, the grouping unit, the connecting unit and the estimating unit included in the apparatus according to the above example aspect.

The above program product provides to estimate the next getting-in time with high accuracy based on the getting-in and off connection data when the getting-off time and the getting-off place are detected.

According to another example aspect of the present disclosure, a method for connecting a getting-in record and a getting-off record of a vehicle includes: storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected; grouping the getting-in records, which represent a same getting-in time zone and a same getting-in place, so that one or more segmentalized getting-in groups are generated, and grouping the getting-off records, which represent a same getting-off time zone and a same getting-off place, so that one or more segmentalized getting-off groups are generated; searching a segmentalized getting-in group, which is connected to each of the one or more segmentalized getting-off groups, and storing connection information in a getting-in and off connection data, wherein the connection information represents a connection between a searched segmentalized getting-in group and a respective segmentalized getting-off group, the searching of the segmentalized getting-in group includes: specifying one segmentalized getting-in group representing a getting-in record, which is stored in the driving history data next to each getting-off record of a respective segmentalized getting-off group; and determining the one segmentalized getting-in group, which is connected to the respective segmentalized getting-off group, when the number of times that the one segmentalized getting-in group is specified is equal to or larger than predetermined times; and specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time.

The above method provides to estimate the next getting-in time with high accuracy based on the getting-in and off connection data when the getting-off time and the getting-off place are detected.

According to another example aspect of the present disclosure, a program product stored in a non-transitory computer readable storage medium includes instructions for execution by a computer, the instructions including the method for connecting the getting-in record and the getting-off record of the vehicle according to the above another example aspect, the method being computer-implemented.

The above program product provides to estimate the next getting-in time with high accuracy based on the getting-in and off connection data when the getting-off time and the getting-off place are detected.

BRIEF DESCRIPTION OF THE DRAWINGS

The above and other objects, features and advantages of the present invention will become more apparent from the following detailed description made with reference to the accompanying drawings. In the drawings:

FIG. 3 is a diagram showing driving history data;

FIG. 4 is a flowchart showing a process executed by a getting-in and off action estimation unit;

DETAILED DESCRIPTION

Figure 1:
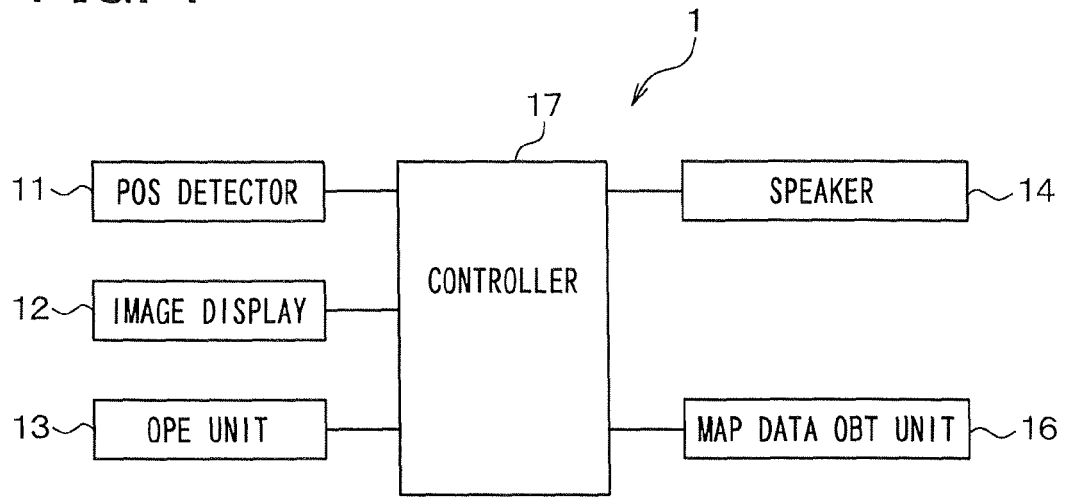
FIG. 1 is a diagram showing a navigation device according to an example embodiment.

FIG. 1 shows an in-vehicle navigation device 1 as an apparatus for connecting a getting-in record and a getting-off record of a vehicle according to an example embodiment. The vehicle, on which the device 1 is mounted, includes an electric motor for driving the vehicle as a power source for driving. A battery for supplying electricity to the electric motor is a secondary battery, and the battery is chargeable with using an external electric power source such as a home electric power source and a battery charger. The vehicle is, for example, an electric vehicle or a plug-in hybrid vehicle. Further, the vehicle includes an air conditioner for a compartment of the vehicle.

As shown in FIG. 1, the device 1 includes a position detector 11, an image display 12, an operation unit 13, a speaker 14, a map data obtaining unit 16 and a controller 17.

The position detector 11 includes a GPS receiver, a vehicle speed sensor, an acceleration sensor, a gyro sensor and the like so that the detector 11 detects a current position of the vehicle, and outputs a signal for specifying the current position to the controller 17. The image display 12 is a liquid crystal display or the like so that the display 12 displays a character or an image according to a control signal from the controller 17. The operation unit 13 receives an operation of a user, and inputs a signal corresponding to the operation to the controller 17.

The map data obtaining unit 16 obtains map data according to a control signal from the controller 17, and inputs the map data to the controller 17. An obtaining method of the map data is such that the map data is read out from a memory medium such as a flash memory and a magnetic storage medium, which is disposed in the map data obtaining unit 16 and is rewritable. Alternatively, the map data may be downloaded from an external map data server via a wireless communication system.

The map data obtained by the map data obtaining unit 16 includes road data expressing a position, a shape and a connection relationship of a link and facility data expressing a position of a facility such as a hotel, a restaurant, a grocery store and a parking lot. Here, the link represents a section of a road. The facility data includes information about a place of a charging spot for charging a driving battery of the vehicle and a cost for charging the battery per unit electricity at the charging spot.

Figure 2:
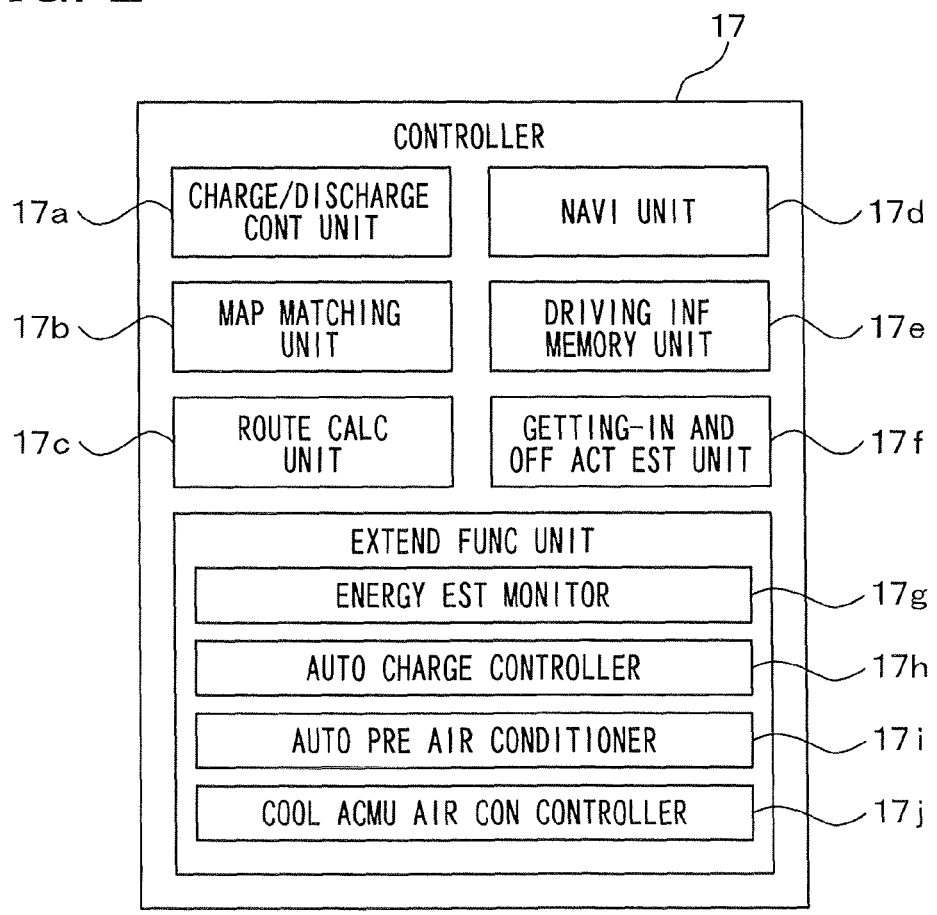
FIG. 2 is a diagram showing a controller in the navigation device.

The controller 17 includes a CPU, a RAM, a ROM, a flash memory and the like. The controller 17 is, for example, micro controller, i.e., micro computer. When the CPU executes a program stored in the flash memory or the ROM, the controller 17 realizes various functions. The functions of the controller 17 are shown in FIG. 2. Specifically, the controller 17 has a charge/discharge control unit 17a, a map matching unit 17b, a route calculation unit 17c, a navigation unit 17d, a driving information memory unit 17e and a getting-in and off action estimation unit 17f.

The charge/discharge control unit 17a executes a process for controlling to charge and discharge the driving battery, which is used for the electric motor of driving the vehicle, and a process for detecting a state of charge (i.e., SOC), which represents a charge amount of the driving battery. Here, in the charging process, the driving electric motor is rotated by a braking force or a driving force of an engine of the vehicle so that the motor generates electricity, and the generated electric power is charged in the driving battery. Alternatively, in the charging process, the driving battery is charged by the electric power from the external power source such as a home electric power source and a battery charger arranged a charging spot. In the discharging process, the driving electric motor is rotated by the electric power stored in the driving battery, and the vehicle runs with using a rotation force of the motor.

The map matching unit 17b specifies a current position of the vehicle based on a detection signal from the detector 11, and adjusts the specified current position to a position on the link. The route calculation unit 17c calculates an optimum guiding route from a starting point to an arrival point. Here, the starting point is, for example, the current position, and the arrival point is, for example, a destination, which is set by a user with using the operation unit 13. The navigation unit 17d informs a driver of the vehicle of a route guidance with using the display 12 and the speaker 14 before the vehicle reaches an intersection or a branch, at which the vehicle turns right or left along with the guiding route, so that the navigation unit 17d supports a driver to drive the vehicle along with the guiding route.

The driving information memory unit 17e stores and adds one getting-in and off record in the driving history data in the memory medium of the map data obtaining unit 16. FIG. 3 shows an example of the driving history data. In FIG. 3, a writing date is not shown.

Specifically, the driving information memory unit 17e repeatedly determines whether the driver takes a getting-in action until the unit 17e determines that the driver takes the getting-in action. The getting-in action includes an actual action such that the driver gets in the vehicle, and an action associated with the actual action. When the unit 17e determines that the driver takes the getting-in action, the present time and the current position of the vehicle are stored in the RAM as a getting-in time and the getting-in place. Specifically, the present time is measured when the getting-in action is detected, and the current place is detected when the getting-in action is detected.

Here, the device determines based on the map data which facility the current position relates to. Specifically, the device specifies an area, in which the current position is disposed, and the area is associated with a corresponding facility in the map data. Thus, the device specifies the facility, and defines the facility, which relates to the current position of the vehicle.

When the current position does not relate to a facility in the map data, the device specifies a geographic section, in which the current position is disposed. The device defines the specified geographic section, which relates to the current position of the vehicle. The geographic section is preliminary determined such that, for example, the degree of longitude is divided at every one second, and the degree of latitude is divided at every one second, so that the geographic section is defined.

The determination whether the driver takes the getting-in action, i.e., whether the driver gets in the vehicle is performed based on a fact that a main switch of the vehicle switches from an off-state to an on-state. Specifically, when the main switch turns on, the device determines that the driver gets in the vehicle. Here, when a vehicle runs on an electric motor and an engine, or when the vehicle runs only on the engine, the turn-on and off of the main switch corresponds to the switch-on and off of an engine key. When the vehicle runs only on the electric motor, the turn-on and off of the main switch corresponds to the switch-on and off of an electric power switch.

The driving information memory unit 17e repeatedly determines whether the driver takes a getting-off action until the unit 17e determines that the driver takes the getting-off action. The getting-off action includes an actual action such that the driver gets off the vehicle, and an action associated with the actual action. When the unit 17e determines that the driver takes the getting-off action, the present time and the current position of the vehicle are stored in the RAM as a getting-off time and the getting-off place. Specifically, the present time is measured when the getting-off action is detected, and the current place is detected when the getting-off action is detected. The determination whether the driver takes the getting-off action, i.e., whether the driver gets off the vehicle is performed based on a fact that the main switch of the vehicle switches from the on-state to the off-state. Specifically, when the main switch turns off, the device determines that the driver gets off the vehicle.

With using information of the getting-in time, the getting-in place, the getting-off time and the getting-off place, a getting-in and off record is formed. Specifically, a getting-in record includes a getting-in header showing an event of the getting-in, data of the getting-in time, and data of the getting-in place. A getting-off record includes a getting-off header showing an event of the getting-off, data of the getting-off time, and data of the getting-off place. The getting-in record is associated with the getting-off record so that a pair of the getting-in record and the getting-off record is formed. Further, the pair of getting-in record and the getting-off record together with the driving history number and a recording date provide one getting-in and off record. Here, the driving history number is an identification number for distinguishing individual getting-in and off record in the driving history data. The recording date represents the present time, at which the getting-in and off record is formed and stored.

The getting-in and off record is stored and added in the driving history data of the memory medium in the map data obtaining unit 16. Specifically, the getting-in and off record is written at the top of the driving history data. Alternatively, the getting-in and off record may be written at the bottom of the driving history data. Then, the data of the getting-in time, the data of getting-in place, the data of the getting-off time and the data of the getting-off place in the RAM is deleted.

Thus, the driving information memory unit 17e detects the getting-in action of the driver. Then, the unit 17e defines the getting-in time, at which the unit 17e detects the getting-in action of the driver, the getting-in place wherein the vehicle is disposed, the getting-off time, at which the unit 17e detects the getting-off action of the driver, and the getting-off place where the vehicle is disposed, and further, the unit 17e stores the getting-in and off record in the driving history data successively in the order of driving, or in the chronological order every time when the unit 17e detects the getting-off action. The getting-in and off record includes the getting-in record showing the getting-in time and the getting-in place, and the getting-off record showing the getting-off time and the getting-off place.

Thus, the above process is executed every time when the vehicle runs. Multiple getting-in and off records are stored in the driving history data in the chronological order. For example, when the driver drives the vehicle one hundred times, one hundred getting-in and off records are stored in the driving history data.

Next, the getting-in and off action estimation unit 17f will be explained. The getting-in and off action estimation unit 17f generates a group of the getting-in records, each of which represents the same getting-in place and the getting-in time in the same time zone, according to the driving history data. Thus, the unit 17f forms one or more segmentalized getting-in groups. The getting-in and off action estimation unit 17f generates a group of the getting-off records, each of which represents the same getting-off place and the getting-off time in the same time zone, according to the driving history data. Thus, the unit 17f forms one or more segmentalized getting-off groups. The unit 17f connects one segmentalized getting-in group and a corresponding segmentalized getting-off group, which have strong correlation. Here, the correlation between the getting-in action and the getting-off action is defined by a causal association.

FIG. 4 shows a flowchart of the process executed by the getting-in and off action estimation unit 17f. The getting-in and off action estimation unit 17f executes the process in FIG. 4 once when the main switch of the vehicle turns on. Alternatively, the getting-in and off action estimation unit 17f may execute the process in FIG. 4 once when the driver of the vehicle inputs a predetermined starting operation via the operation unit 13.

In step S100, the getting-in and off action estimation unit 17f generates a list of the getting-in records in the driving history data, each of which represents the same getting-in place, so that the unit 17f generates a group of the getting-in records, each of which represents the same getting-in place.

Figure 5:
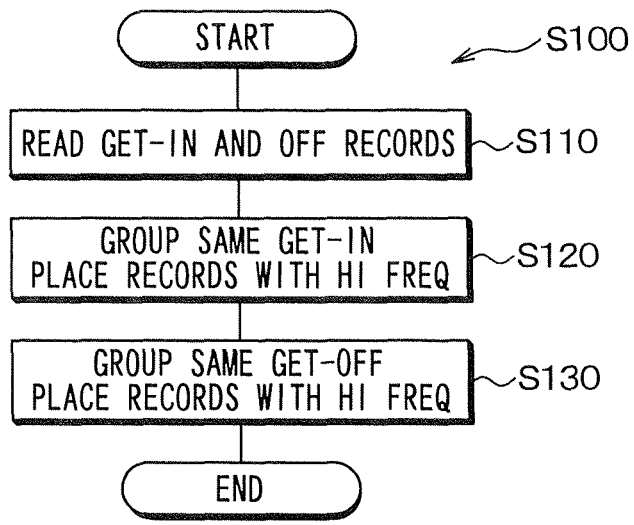
FIG. 5 is a flowchart showing a process in step S100 in FIG. 4.

Specifically, in step S100, a process in FIG. 5 is executed. First, in step S110, the unit 17f reads out getting-in and off records from the driving history data. The number of the getting-in and off records to be read out is preliminary determined so that the predetermined number of the getting-in and off records from the most recent record to a certain record corresponding to the predetermined number such as 100 are read out. In this case, a possibility is reduced such that the process in FIG. 5 is executed with using the driving history data, which is very old and not suited to the current situation.

In step S120, the unit 17f limits certain getting-in places having high getting-in ratio. Specifically, the unit 17f selects the certain getting-in places, at which the driver gets in the vehicle with high frequency. Further, the unit 17f retrieves a group of the getting-in and off records, each of which represents the same limited getting-in place, among the read-out getting-in and off records. Specifically, the unit 17f sorts all getting-in records in the read-out getting-in and off records into a group of the getting-in records, each of which represents the event that the driver gets in the vehicle at the same place.

For example, when the read-out getting-in and off records are shown in FIG. 3, the getting-in records corresponding to the driving history numbers 1, 3, 5 and 7 are sorted into the group of the getting-in records, each of which represents a case where the driver gets in the vehicle at home. The getting-in record corresponding to the driving history number 4 is sorted into the group of the getting-in records, each of which represents a case where the driver gets in the vehicle at a certain super market B.

Figure 6:
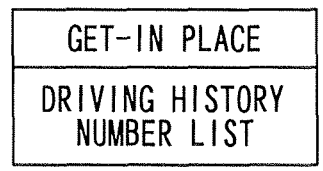
FIG. 6 is a diagram showing getting-in data at the same place.

When a ratio between the number of the getting-in records in each group and the number of a total getting-in and off records read out in step S110 is equal to or larger than a predetermined ratio (e.g., 10%), the getting-in records of the group is defined as the same getting-in place group P. Specifically, the same getting-in place data is formed such that the data shows the getting-in place of the getting-in records and the list of the driving history numbers corresponding to the getting-in records. Then, the same getting-in place data is stored in the memory medium of the map data obtaining unit 16. FIG. 6 shows the same getting-in place data. Accordingly, one same getting-in place data is formed in each same getting-in place group P.

In step S130, a similar process as step S120 is performed with respect to the getting-off records. Specifically, the unit 17f limits certain getting-off places having high getting-off ratio. Specifically, the unit 17f selects the certain getting-off places, at which the driver gets off the vehicle with high frequency. Further, the unit 17f retrieves a group of the getting-in and off records, each of which represents the same limited getting-off place, among the read-out getting-in and off records. Specifically, the unit 17f sorts all getting-off records in the read-out getting-in and off records into a group of the getting-off records, each of which represents the event that the driver gets off the vehicle at the same place.

Figure 7:
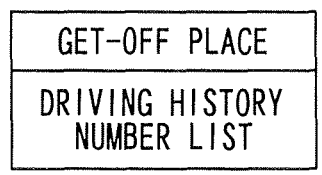
FIG. 7 is a diagram showing getting-off data at the same place.

When a ratio between the number of the getting-off records in each group and the number of a total getting-in and off records read out in step S110 is equal to or larger than the predetermined ratio (e.g., 10%), the getting-off records of the group is defined as the same getting-off place group Q. Specifically, the same getting-off place data is formed such that the data shows the getting-off place of the getting-off records and the list of the driving history numbers corresponding to the getting-off records. Then, the same getting-off place data is stored in the memory medium of the map data obtaining unit 16. FIG. 7 shows the same getting-off place data. Accordingly, one same getting-off place data is formed in each same getting-off place group Q. After step S130, the process in step S100 ends.

Thus, in step S100, the getting-in records showing the same getting-in place, at which the driver gets in the vehicle, are grouped when the frequency of the getting-in records is equal to or larger than the predetermined ratio, so that the same getting-in place group P is defined. The getting-off records showing the same getting-off place, at which the driver gets off the vehicle, are grouped when the frequency of the getting-off records is equal to or larger than the predetermined ratio, so that the same getting-off place group Q is defined. After step S100, it goes to step S200.

In step S200, a list of the getting-in records, which represent the same getting-in time zone, is formed in each of the getting-in place groups P defined in step S120. Thus, the getting-in records representing the same getting-in place and the same getting-in time zone so that the driver gets in the vehicle at the same place in the same time zone are grouped so that a segmentalized getting-in group p is formed. A list of the getting-off records, which represent the same getting-off time zone, is formed in each of the getting-off place groups Q defined in step S130. Thus, the getting-off records representing the same getting-off place and the same getting-off time zone so that the driver gets off the vehicle at the same place in the same time zone are grouped so that a segmentalized getting-off group q is formed.

Figure 8:
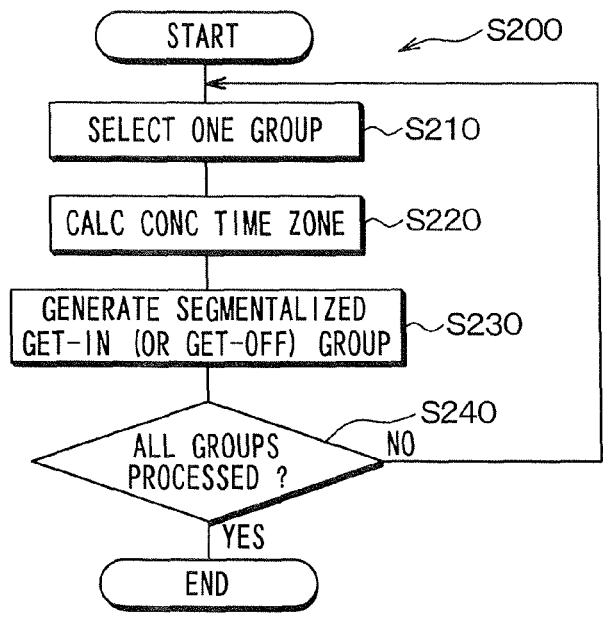
FIG. 8 is a flowchart showing a process in step S200 in FIG. 4.

FIG. 8 shows a process in step S200. In step S210, the getting-in and off action estimation unit 17f retrieves (i.e., selects) one getting-in place group P or one getting-off place group Q. The unit 17f executes steps S220 and S230 based on the retrieved getting-in place group P or the retrieved getting-off place group Q. Then, in step S240, the unit 17f determines whether steps S220 and S230 are executed with respect to all of the getting-in place groups P and all of the getting-off place groups Q. When the unit 17f determines that steps S220 and S230 are executed with respect to all of the getting-in place groups P and all of the getting-off place groups Q, the process in step S200 ends. When the unit 17f determines that steps S220 and S230 are not executed with respect to all of the getting-in place groups P and all of the getting-off place groups Q, it goes to step S210. In step S210, the unit 17f retrieves new one getting-in place group P or new one getting-off place group Q, which has not been retrieved yet. Accordingly, steps S220 and S230 are executed once with respect to each getting-in place group P, and steps S220 and S230 are executed once with respect to each getting-off place group Q.

First, steps S220 and S230 executing with respect to one getting-in place group P will be explained. In step S220, the unit 17f calculates a distribution of the getting-in time of the getting-in records in the getting-in place group P, and further, the unit 17f retrieves the time zone, in which the distribution of the getting-in time is concentrated, i.e., in which the distribution of the getting-in time has a maximum.

A method for retrieving the time zone, in which the distribution of the getting-in time of the getting-in records in the getting-in place group P is concentrated, will be explained as follows. First, a record period for storing both of the getting-in record and the getting-off record, which are read out from the driving history data, is specified. Specifically, the recording date of the getting-in and off record, which is the oldest recording data among the getting-in and off records read out in step S110, is specified. The record period is calculated based on a total number of days from the oldest recording date and the present day.

Figure 9:
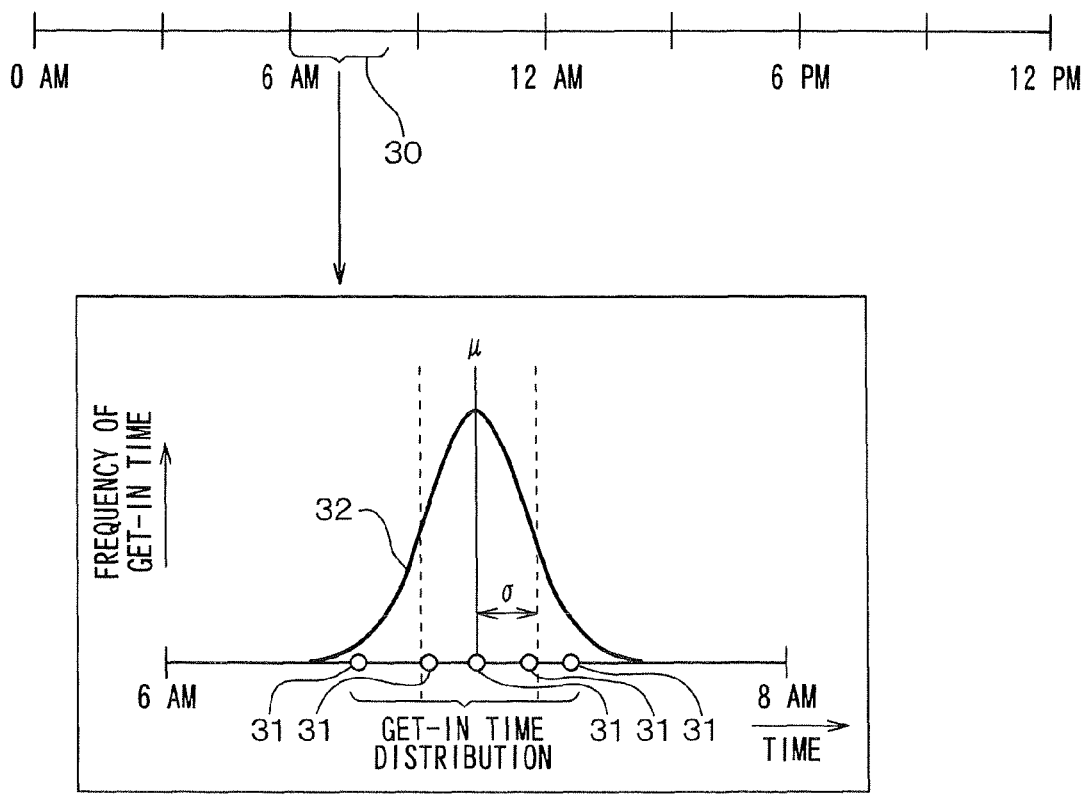
FIG. 9 is a diagram showing a distribution of a getting-in time in an extraction period.

Then, as shown in FIG. 9, a retrieval time period 30 is set. The length of the retrieval time period 30 is set to be two hours, for example. The retrieval time period 30 is successively set such that the starting time of the retrieval time period 30 shifts from 0:00 a.m. to 10:00 p.m. by one hour successively. Specifically, the first retrieval time period 30 is set from 0:00 a.m. to 2:00 a.m. Then, the second retrieval time period 30 is set from 1:00 a.m. to 3:00 a.m. Next, the third retrieval time period 30 is set from 2:00 a.m. to 4:00 a.m. Thus, the retrieval time period 30 shifts successively. When one retrieval time period 30 is set, the time zone, in which the getting-in time concentrates, is searched.

The concentration time zone of the getting-in time is searched in each retrieval time period as follows. For example, in FIG. 9, the retrieval time period is between 6:00 a.m. to 8:00 a.m. The getting-in time 31 in each getting-in record, at which the driver gets in the vehicle, is disposed in the retrieval time period 30, and the getting-in record belongs to the same getting-in place group P. The getting-in time 31 in each getting-in record has a normal distribution 32, which is estimated by a conventional method. In FIG. 9, a graph has a vertical axis defined by the frequency of the getting-in time, and the horizontal axis defined by time. Specifically, the getting-in time 31 is used as a sample, so that the normal distribution 32 is estimated. An average $\mu$ and a dispersion $\sigma^2$ of the estimated normal distribution 32 are calculated When a value obtained by dividing the number of samples of the getting-in time 31 with the record period is equal to or larger than a predetermined first threshold value such as 0.05, and the dispersion $\sigma^2$ is smaller than a second threshold value such as a square of 20 minutes, the concentration time zone of the getting-in time distribution is defined by a range having a center of the average $\mu$ and a width of a standard deviation $\sigma$ multiplied by a predetermined number n. Here, n represents, for example, 2 or 3. Thus, the concentration time zone is disposed between the average $\mu$ minus n×$\sigma$ and the average $\mu$ plus n×$\sigma$.

The reason why the retrieval time period is set to be smaller than 24 hours is to find multiple concentration time zones of the getting-in time. Even when the normal distribution is estimated in a whole of 24 hours, and the average $\mu$ and the dispersion $\sigma^2$ of the estimated normal distribution are calculated, multiple concentration time zones may not be calculated. The multiple concentration time zones may correspond to, for example, morning commute and evening commute.

However, the commute time and a shopping time of the driver are varied within a certain time range. Specifically, the getting-in time and the getting-off time of the vehicle when the driver goes shopping, goes to an office, or comes home from the office may be varied. Accordingly, if the retrieval time period 30 is short, it is difficult to find the concentration time zone corresponding to routine behavior of the driver such as the commute and the shopping. Thus, when the retrieval time period 30 is set to be two hours, it is possible to find the meaningful concentration of the routine behavior of the driver. Specifically, it is considered that two hours are wider than the variation of the getting-in time and the getting-off time of the vehicle in case of the shopping and the commute. The retrieval time period 30 may be set to be one, three or four hours.

When the retrieval time period 30 is short, and the concentration time zone of the getting-in time has a center near the boundary between two retrieval time periods 30, it may be difficult to find the concentration time zone. For example, when the concentration time zone of the getting-in time is disposed around eight a.m., the concentration time zone may not be found. Thus, the retrieval time period 30 shifts by a predetermined time interval, which is shorter than the length of the retrieval time period 30 so that the concentration time zone is easily found even if the concentration time zone is disposed in any time of the retrieval time period 30.

Further, the second threshold value of the dispersion $\sigma^2$ is preliminary set, and when the dispersion $\sigma^2$ is smaller than the second threshold value, the unit 17f determines that the concentration of the getting-in time occurs. This is because the retrieval time period 30 is set to be wider than the variation of the getting-in time and the getting-off time of the routine behavior of the driver.

In step S230, the getting-in records representing the getting-in time in the concentration time zone are retrieved from the selected getting-in place group P. The retrieved getting-in records from the selected getting-in place group P represent the getting-in action of the driver so that the driver gets in the vehicle at the getting-in time in the concentration time zone. The retrieved getting-in records are grouped so that one segmentalized getting-in group p is formed.

Figure 10:
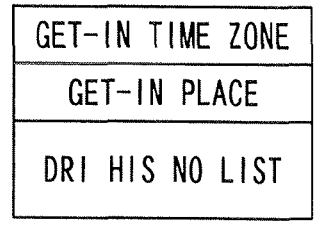
FIG. 10 is a diagram showing getting-in data at the same place and the same time zone.

Specifically, the same getting-in place and time zone data representing the concentration time zone, the same getting-in place and the list of the driving history numbers of the getting-in records is formed, so that the retrieved getting-in records are grouped into the segmentalized getting-in group p. FIG. 10 shows the same getting-in place and time zone data.

Next, steps S220 and S230 executing with respect to one getting-off place group Q will be explained. In step S220, the unit 17f calculates a distribution of the getting-off time of the getting-off records in the getting-off place group Q, and further, the unit 17f retrieves the time zone, in which the distribution of the getting-off time is concentrated, i.e., in which the distribution of the getting-off time has a maximum. The retrieving method of the concentration time zone of the getting-off place group Q is similar to the retrieving method of the concentration time zone of the getting-in place group P such that the getting-in place group P is replaced to the getting-off place group Q, and the getting-in event is replaced to the getting-off event.

In step S230, the getting-off records representing the getting-off time in the concentration time zone are retrieved from the selected getting-off place group Q. The retrieved getting-off records from the selected getting-off place group Q represent the getting-off action of the driver so that the driver gets off the vehicle at the getting-off time in the concentration time zone. The retrieved getting-off records are grouped so that one segmentalized getting-off group q is formed.

Figure 11:
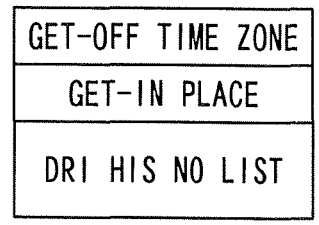
FIG. 11 is a diagram showing getting-off data at the same place and the same time zone.

Specifically, the same getting-off place and time zone data representing the concentration time zone, the same getting-off place and the list of the driving history numbers of the getting-off records is formed, so that the retrieved getting-off records are grouped into the segmentalized getting-off group q. FIG. 11 shows the same getting-off place and time zone data.

Thus, in step S200, the unit 17f segmentalizes the getting-in place group P and the getting-off place group Q with using the concentration getting-in time zone and the concentration getting-off time zone, respectively, so that the segmentalized getting-in group p and the segmentalized getting-off group q are formed.

Figure 12:
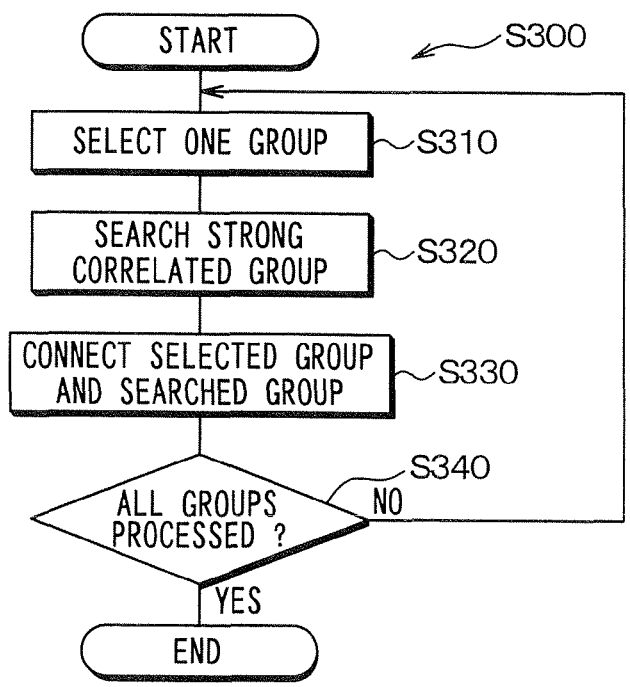
FIG. 12 is a flowchart showing a process in step S300 in FIG. 4.

After step S200, the unit 17f proceeds to step S300. The unit 17f connects the segmentalized getting-in group p and the segmentalized getting-off group q. A process in step S300 is shown in FIG. 12.

The unit 17f retrieves one segmentalized getting-in group p or one segmentalized getting-off group q in step S310. The unit 17f executes steps S320 and S330 with respect to the retrieved segmentalized getting-in group p. Then, in step S340, the unit 17f determines whether steps S320 and S330 are executed with respect to all of the segmentalized getting-in place groups p and all of the segmentalized getting-off place groups q. When the unit 17f determines that steps S320 and S330 are executed with respect to all of the segmentalized getting-in place groups p and all of the segmentalized getting-off place groups q, the process in step S300 ends. When the unit 17f determines that steps S320 and S330 are not executed with respect to all of the segmentalized getting-in place groups p and all of the segmentalized getting-off place groups q, it goes to step S310. In step S310, the unit 17f retrieves new one segmentalized getting-in place group p or new one segmentalized getting-off place group q, which has not been retrieved yet. Accordingly, steps S320 and S330 are executed once with respect to each segmentalized getting-in place group p, and steps S320 and S330 are executed once with respect to each segmentalized getting-off place group q.

First, steps S320 and S330 executing with respect to one segmentalized getting-in place group p will be explained. In step S320, the unit 17f searches the segmentalized getting-off place group q, which has strong correlation with the segmentalized getting-in place group p.

When the segmentalized getting-off place group q is searched, the number of the getting-in records in the segmentalized getting-in place group p is calculated as a total number of getting-in records. The total number of getting-in records is multiplied with a predetermined ratio Kp so that a reference number of times is calculated. Here, the predetermined ratio Kp is in a range between 0 and 1.

The getting-off record corresponding to the getting-in record is specified in each of the getting-in records in the segmentalized getting-in place group p. The getting-off record and the getting-in record provide a pair and stored as the getting-in and off record. Then, the segmentalized getting-off place group q, to which the specified getting-off record belongs, is determined. Thus, the segmentalized getting-off place groups q are specified such that the number of the segmentalized getting-off place groups q is at most equal to the number of the getting-in records, which belongs to the segmentalized getting-in place group p. The same segmentalized getting-off place group q may be specified multiple times.

As a result, when the overlapping times of the same segmentalized getting-off place group q is equal to or larger than the predetermined reference times, it is determined that the segmentalized getting-off place group q strongly correlates to the selected segmentalized getting-in place group p.

Thus, the searched segmentalized getting-off place group q represents the getting-off time and the getting-off place with high possibility when the driver gets in the vehicle at the getting-in place in the getting-in time zone, which are shown in the selected segmentalized getting-in place group p.

Figure 13:
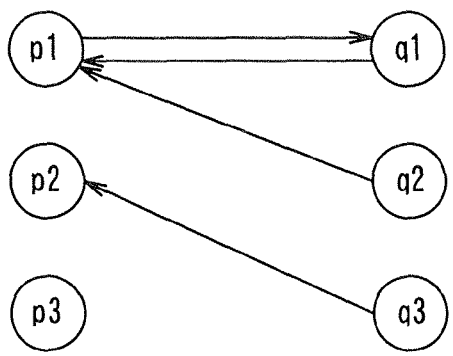
FIG. 13 is a diagram showing a way of linking getting-in data and getting-off data.

In step S330, the unit 17f connects the searched segmentalized getting-off place group q and the selected segmentalized getting-in place group p. The unit 17f stores connection information of the searched segmentalized getting-off place group q and the selected segmentalized getting-in place group p in getting-in and off connection data of the memory medium of the map data obtaining unit 16. FIG. 13 shows the getting-in and off connection data. In FIG. 13, the segmentalized getting-in place group p1 is connected to the segmentalized getting-off place group q1.

Next, steps S320 and S330 executing with respect to one segmentalized getting-off place group q will be explained. In step S320, the unit 17f searches the segmentalized getting-in place group p, which has strong correlation with the segmentalized getting-off place group q.

When the segmentalized getting-in place group p is searched, the number of the getting-off records in the segmentalized getting-off place group q is calculated as a total number of getting-off records. The total number of getting-off records is multiplied with a predetermined ratio Kq so that a reference number of times is calculated. Here, the predetermined ratio Kq is in a range between 0 and 1. The predetermined ratio Kq may be the same as the predetermined ratio Kp. Alternatively, the predetermined ratio Kq may be different from the predetermined ratio Kp.

The getting-in record, which is stored in the driving history data next to the getting-off record, is specified in each of the getting-off records in the segmentalized getting-off place group q. The getting-in record is disposed next to the getting-off record, and the getting-in record represents the getting-in time and the getting-in place when the driver gets in the vehicle after the driver gets off the vehicle, which is stored as the getting-off record.

Then, the segmentalized getting-in place group p, to which the specified getting-in record belongs, is determined. Thus, the segmentalized getting-in place groups p are specified such that the number of the segmentalized getting-in place groups p is at most equal to the number of the getting-off records, which belongs to the segmentalized getting-off place group q. The same segmentalized getting-in place group p may be specified multiple times. As a result, when the overlapping times of the same segmentalized getting-in place group p is equal to or larger than the predetermined reference times, it is determined that the segmentalized getting-in place group p strongly correlates to the selected segmentalized getting-off place group q.

Thus, the searched segmentalized getting-in place group p represents the getting-in time and the getting-in place with high possibility after the driver gets off the vehicle at the getting-off place in the getting-off time zone, which are shown in the selected segmentalized getting-off place group q.

In step S330, the unit 17f connects the searched segmentalized getting-in place group p and the selected segmentalized getting-off place group q. The unit 17f stores connection information of the searched segmentalized getting-in place group p and the selected segmentalized getting-off place group q in getting-in and off connection data of the memory medium of the map data obtaining unit 16. FIG. 13 shows the getting-in and off connection data. In FIG. 13, the segmentalized getting-off place group q2 is connected to the segmentalized getting-in place group p1, and the segmentalized getting-off place group q3 is connected to the segmentalized getting-in place group p2.

Thus, the unit 17*f* groups the getting-in records, which represent the same getting-in place and the same getting-in time zone, among the driving history data so that one or more segmentalized getting-in place groups are formed. Further, the unit 17*f* groups the getting-off records, which represent the same getting-off place and the same getting-off time zone, among the driving history data so that one or more segmentalized getting-off place groups are formed. The unit 17*f* searches the segmentalized getting-in place group, which strongly correlates to each segmentalized getting-in place group. The unit 17*f* stores connection information showing the connection between the searched segmentalized getting-in place group and a corresponding segmentalized getting-off place group in the getting-in and off connection data.

Thus, the getting-in record stored next to the getting-off record in the segmentalized getting-off place group is searched in the driving history data. The segmentalized getting-in place group, to which the searched getting-in record belongs, is specified. When the number of times that the segmentalized getting-in place group is specified is equal to or larger than predetermined times, the segmentalized getting-in place group is connected to the segmentalized getting-off place group, i.e., the segmentalized getting-in place group is determined as a connection object of the segmentalized getting-off place group. Thus, the segmentalized getting-in place group, which is strongly connected to the segmentalized getting-off place group, is specified.

Further, the unit 17*f* searches the segmentalized getting-off place group, which is strongly connected to the segmentalized getting-in place group, with regard to each of the segmentalized getting-in place groups. The unit 17*f* stores the connection information in the getting-in and off connection data such that the searched segmentalized getting-off place group is connected to the segmentalized getting-in place group.

In the driving history data, the getting-off record stored as the getting-in and off record is specified such that the getting-off record and the getting-in record in the segmentalized getting-in place group provide a pair. Then, the segmentalized getting-off place group, to which the getting-off record belongs, is specified. When the number of times that the segmentalized getting-off place group is specified is equal to or larger than predetermined times, the segmentalized getting-off place group is connected to the segmentalized getting-in place group, i.e., the segmentalized getting-off place group is determined as a connection object of the segmentalized getting-in place group. Thus, the segmentalized getting-off place group, which is strongly connected to the segmentalized getting-in place group, is specified.

Specifically, in view of the relationship between the getting-in time, the getting-in place, the getting-off time and the getting-off place, the getting-in place and the getting-in time zone are connected to the getting-off place and the getting-off time zone. Similarly, the getting-off place and the getting-off time zone are connected to the getting-in place and the getting-in time zone.

For example, when a driver leaves a home in the same time zone Ta every morning, and the driver reaches an office in a certain time zone Tb, the getting-in and off record is accumulated in the driving history data every day. In this case, in the getting-in and off connection data generated by the unit 17*f*, the getting-in event at the home in the time zone Ta is connected to the getting-off event at the office in the time zone Tb.

Further, three or more segmentalized getting-in place groups and the segmentalized getting-off place groups may be connected. For example, when the driver reaches a supermarket in a time zone Tc, the driver leaves the supermarket in a time zone Td, and then, the driver reaches the home in a time zone Te, and the driver repeats these behavior patterns, the getting-off event at the supermarket in the time zone Tc is connected to the getting-in event at the supermarket in the time zone Td, and the getting-in event at the supermarket in the time zone Td is connected to the getting-off event at the home in the time zone Te in the getting-in and off connection data generated by the unit 17*f*. Thus, when the behavior pattern of the driver is stored as the connection information in the getting-in and off connection data, various processes described later are executed.

The unit 17*f* groups the same getting-in place or getting-off place records in step S100. Then, in step S200, the same time zone records in the grouped getting-in place or getting-off place records are grouped so that the segmentalized getting-in or getting-off place group is generated. Further, in steps S120 and S130, when the number of records, which represents the same getting-in or getting-off place, is equal to or larger than predetermined times, the same getting-in place or getting-off place records are grouped.

Further, in steps S220 and S230, the unit 17*f* groups the same getting-in or getting-off time zone records when the number of records, which represents the same getting-in or getting-off time zone, is equal to or larger than predetermined times.

Thus, an incidental behavior of the driver, which is not a habitual behavior of the driver, is eliminated from the group. Thus, the habitual behavior of the driver substantially reflects on the connection information.

Next, a process for utilizing the getting-in and off connection data stored in the device will be explained. The controller 17 includes the energy estimation monitor 17*g*, the automatic charge controller 17*h*, the automatic preliminary air-conditioner 17*i* and the cooling accumulation air-conditioning controller 17*j* as extended function units, which utilize the getting-in and off connection data, as shown in FIG. 2.

First, the energy estimation monitor 17*g* will be explained. The energy estimation monitor 17*g* stores data of the amount of accumulation energy in a driving battery in the energy transition data of the memory medium in the map data obtaining unit 16 based on a SOC (i.e., state of charge) of the driving battery detected by the energy estimation monitor 17*g* when the vehicle runs in an object link.

The energy estimation monitor 17*g* estimates the transition of the energy accumulated in the driving battery according to the energy transition data. Thus, the energy estimation monitor 17*g* executes a process shown in FIG. 14. Specifically, the energy estimation monitor 17*g* executes the process in FIG. 14 when the driver starts to drive the vehicle.

When a destination and a guiding route to the destination are set by the route calculation unit 17*c* at the beginning time of the process, the energy estimation monitor 17*g* determines in step S410 that the destination is set. Then, it goes to step S430. In step S430, the energy estimation monitor 17*g* specifies the change amount of the accumulation energy in the driving battery in each link on the guiding route based on the energy transition data. Based on the specified change amount, the energy estimation monitor 17*g* estimates the transition of the accumulated energy in the driving battery from the current position to the destination along with the guiding route.

In step S430, with using the image display 12 and/or the speaker 14, the energy estimation monitor 17*g* ask the driver whether the transition of the accumulation energy in the driving battery is displayed. When the driver performs a permission operation with using the operation unit 13, the energy estimation monitor 17*g* controls the display 12 to display a graph of the transition. When the driver performs a prohibition operation with using the operation unit 13, the process in FIG. 14 ends.

Figure 14:
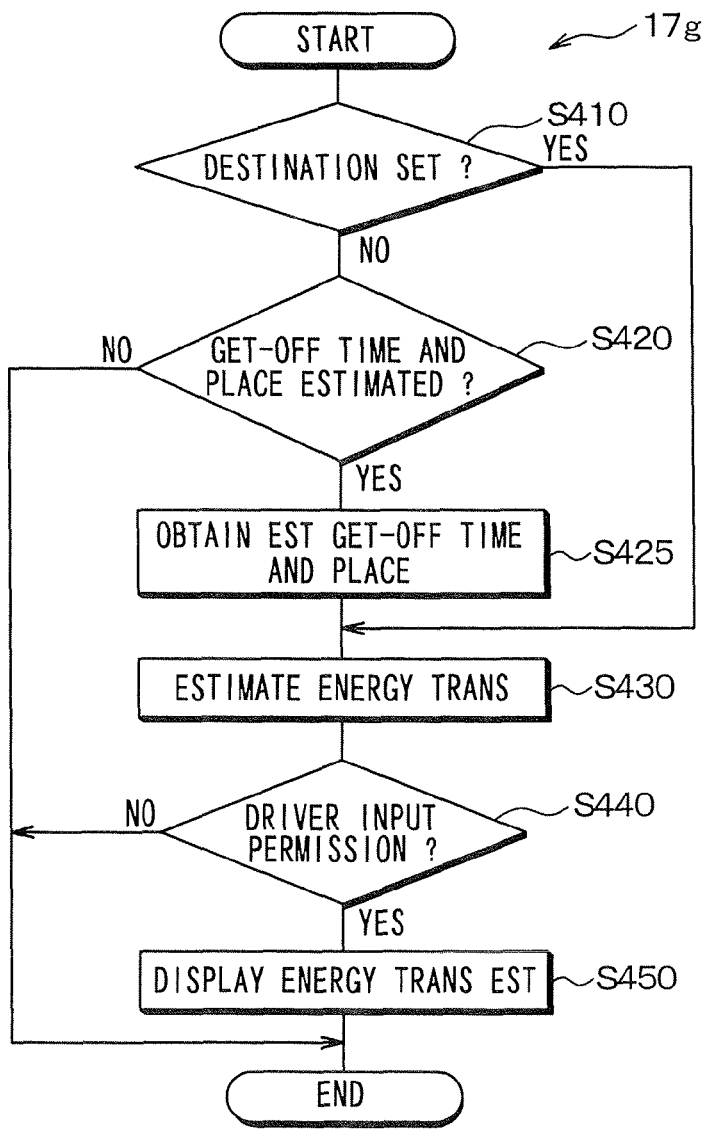
FIG. 14 is a flowchart showing a process in an energy estimation monitor.

The process in FIG. 14 in case where the destination and the guiding route to the destination are set by the route calculation unit 17c at the beginning time of the process is conventional. When the destination and the guiding route to the destination are not set by the route calculation unit 17c at the beginning time of the process, the process in FIG. 14 is new. In step S410, when the energy estimation monitor 17g determines that the destination is set, it goes to step S420.

In Step S420, the current getting-in time and the current getting-in place are specified such that the current getting-in time is the latest time when the main power source of the vehicle turns on, and the current getting-in place is the current position of the vehicle at the current getting-in time. Further, the energy estimation monitor 17g determines whether a condition is satisfied that the segmentalized getting-in place group p corresponding to the current getting-in time and the current getting-in place exists in the getting-in and off connection data, and the existing segmentalized getting-in place group p is connected to one of the segmentalized getting-off place groups q.

A method for specifying the segmentalized getting-in place group p corresponding to the current getting-in time and the current getting-in place is explained as follows. Based on the same getting-in time and same getting-in place data, it is determined whether the getting-in time zone and the getting-in place in the segmentalized getting-in place group p include the current getting-in time and the current getting-in place. When the segmentalized getting-in place group p includes the current getting-in time and the current getting-in place, the segmentalized getting-in place group p is specified to correspond to the current getting-in time and the current getting-in place.

When the condition is not satisfied, the process in FIG. 14 ends. When the condition is satisfied, it goes to step S425. In step S425, the segmentalized getting-off place group q, which is connected to the segmentalized getting-in place group p corresponding to the current getting-in time and the current getting-in place, is specified based on the getting-in and off connection data. For example, the segmentalized getting-off place group q1 connected to the segmentalized getting-in place group p1 in FIG. 13 is specified. Based on the same getting-off place and same getting-off time zone data of the segmentalized getting-off place group q, the getting-off time zone and the getting-off place in the segmentalized getting-off place group q are obtained. The obtained getting-off time zone provides an estimated getting-off time zone, at which the driver is to get off the vehicle. The obtained getting-off place provides an estimated getting-off place, at which the driver is to get off the vehicle.

Further, in step S425, the energy estimation monitor 17g controls the route calculation unit 17c to calculate the guiding route from the current position as a starting point to the estimated getting-off place as the destination. Then, it goes to step S430. Here, if the arrival time to the destination calculated according to the calculated guiding route is different from the estimated getting-off time zone, the process in FIG. 14 may end without proceeding to step S430. After step S425, step S430 and the following steps are executed as described above.

Thus, the current getting-in time, at which the controller 17 determines for the last time that the driver gets in the vehicle, and the current position of the vehicle, at which the vehicle is disposed at the current getting-in time, are specified. The segmentalized getting-in place group p representing the getting-in time zone and the getting-in place corresponding to the current getting-in time and the current position is specified. The segmentalized getting-off place group q, which is strongly connected to the specified segmentalized getting-in place group p, is determined based on the getting-in and off connection data. Based on the getting-off time zone and the getting-off place corresponding to the determined segmentalized getting-off place group q, the getting-off time and the getting-off place, at which the driver is to get off the vehicle, are estimated.

Thus, since the segmentalized getting-in place group p is connected to the segmentalized getting-off place group q in the getting-in and off connection data, even if the destination is not set, the getting-off time and the getting-off place are estimated with high accuracy based on the getting-in and off connection data when the current getting-in time or the current position is detected. With using the estimated getting-off time and the estimated getting-off place, the transition of the accumulation energy in the driving battery is estimated. Further, various processes may be executed.

Next, the automatic charge controller 17h will be explained. The automatic charge controller 17h controls the charge/discharge control unit 17a to switch automatically between execution and non-execution for charging the driving battery from the external power source such as a home electric power source and a battery charger.

Figure 15:
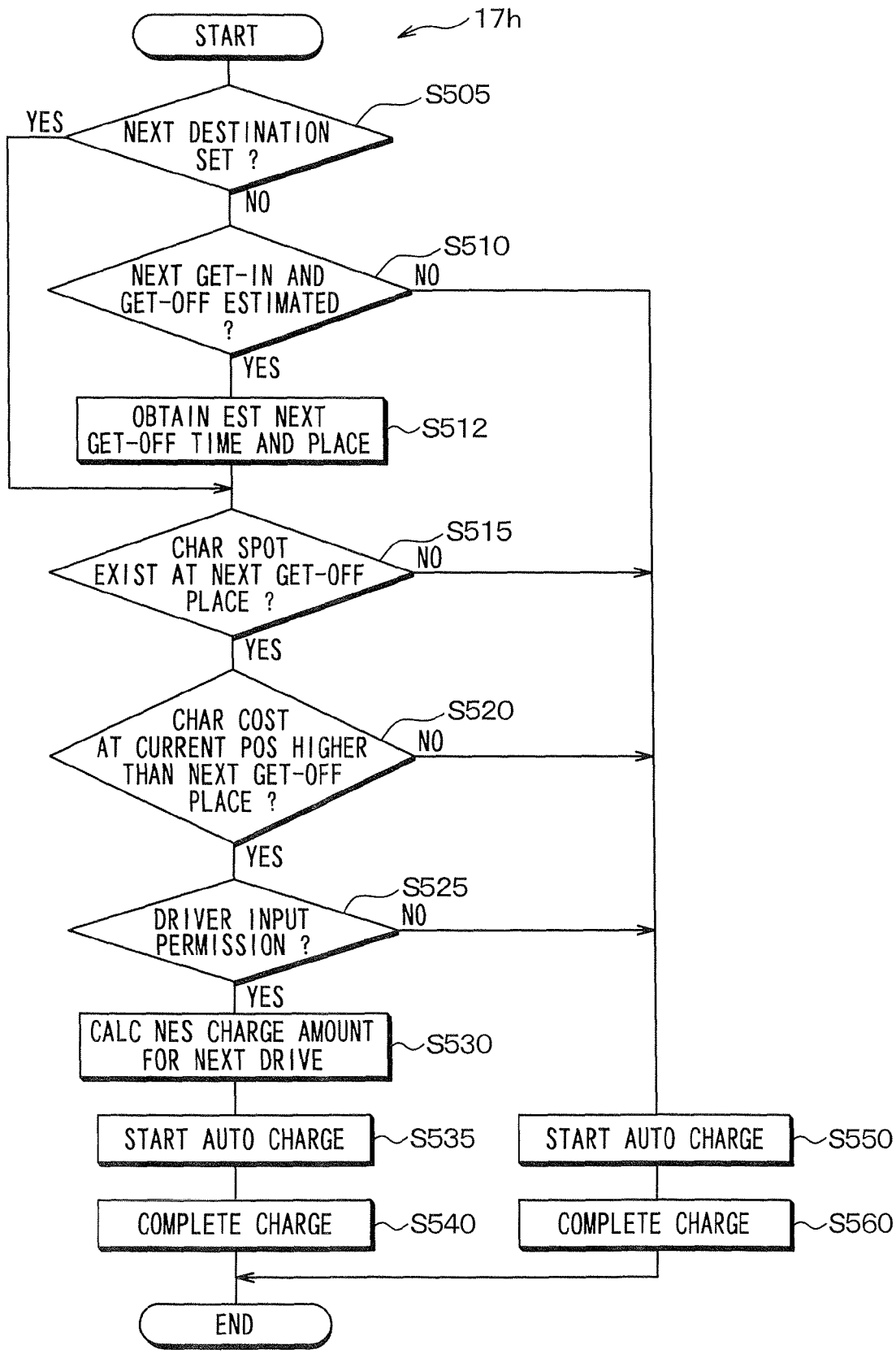
FIG. 15 is a flowchart showing a process in an automatic charging controller.

Thus, the automatic charge controller 17h executes to start a process in FIG. 15 when the external power source is connected to the driving battery via an electric cable so that the driving battery is chargeable.

When a destination and a guiding route to the destination are set by the route calculation unit 17c at the beginning time of the process, the automatic charge controller 17h determines in step S505 that the destination is set. Then, it goes to step S515. In step S515, the automatic charge controller 17h determines based on the map data whether a charge spot is disposed at the destination (or the getting-off place). When the automatic charge controller 17h determines that a charge spot is not disposed at the destination, it goes to step S550. In step S550, the automatic charge controller 17h controls the charge/discharge control unit 17a to charge the battery from the external power source. In step S560, the automatic charge controller 17h controls the charge/discharge control unit 17a to complete the charge of the battery until the driver gets in the vehicle, the driver operates the operation unit 13 to cancel the charge operation, or the driving battery is charged fully.

When the automatic charge controller 17h determines that the charge spot is disposed at the destination, it goes to step S520. In step S520, the automatic charge controller 17h compares a charge cost per unit electricity at the charge spot of the current position and a charge cost per unit electricity at the charge spot of the getting-off place. Thus, the automatic charge controller 17h determines whether the charge cost per unit electricity at the charge spot of the current position is higher than the charge cost per unit electricity at the charge spot of the getting-off place. When the charge cost per unit electricity at the charge spot of the current position is not higher than the charge cost per unit electricity at the charge spot of the getting-off place, it goes to step S550. When the charge cost per unit electricity at the charge spot of the current position is higher than the charge cost per unit electricity at the charge spot of the getting-off place, it goes to step S525.

In step S525, with using the image display 12 and/or the speaker 14, the automatic charge controller 17h ask the driver whether the battery is charged at the destination according to a plan. When the driver performs a permission operation with using the operation unit 13, it goes to step S530. When the driver performs a prohibition operation with using the operation unit 13, it goes to step S550.

In step S530, the automatic charge controller 17h controls the route calculation unit 17c to calculate the guiding route from the current position as a starting point to the estimated getting-off place as the destination. Then, based on the distance along with the guiding route between the current position and the destination and the like, the automatic charge controller 17h calculates a necessary charge amount, which is a necessary electric amount of the driving battery to be consumed for the next driving from the current position to the destination, i.e., the getting-off place.

In step S535, the automatic charge controller 17h controls the charge/discharge control unit 17a to charge the battery from the external power source. In step S560, the automatic charge controller 17h controls the charge/discharge control unit 17a to complete the charge of the battery until the driver gets in the vehicle, the driver operates the operation unit 13 to cancel the charge operation, or the driving battery is charged to the necessary charge amount.

The process in FIG. 15 in case where the destination and the guiding route to the destination are set by the route calculation unit 17c at the beginning time of the process is conventional. When the destination and the guiding route to the destination are not set by the route calculation unit 17c at the beginning time of the process, the process in FIG. 14 is new. In step S505, when the automatic charge controller 17h determines that the destination is not set, it goes to step S510.

In step S510, the current getting-off time and the current getting-off place are specified such that the current getting-off time is the latest time when the main power source of the vehicle turns off, and the current getting-off place is the current position of the vehicle at the current getting-off time. Here, the main power source of the vehicle is off before the automatic charge controller 17h starts to execute the process in FIG. 15. Further, the automatic charge controller 17h determines whether a condition is satisfied that the segmentalized getting-off place group q corresponding to the current getting-off time and the current getting-off place exists in the getting-in and off connection data, and the existing segmentalized getting-off place group q is connected to one of the segmentalized getting-in place groups p, and further, the connected segmentalized getting-in place group p is connected to one of the segmentalized getting-off place groups q.

Here, a method for specifying the segmentalized getting-off place group q corresponding to the current getting-off time and the current getting-off place is explained as follows. Based on the same getting-off time and same getting-off place data, it is determined whether the getting-off time zone and the getting-off place in the segmentalized getting-off place group q include the current getting-off time and the current getting-off place. When the segmentalized getting-off place group q includes the current getting-off time and the current getting-off place, the segmentalized getting-off place group q is specified to correspond to the current getting-off time and the current getting-off place.

When the condition is not satisfied, it goes to step S550. When the condition is satisfied, it goes to step S512. In step S512, the segmentalized getting-in place group p, which is connected to the segmentalized getting-off place group q corresponding to the current getting-off time and the current getting-off place, is specified based on the getting-in and off connection data. For example, the segmentalized getting-in place group p1 connected to the segmentalized getting-off place group q2 in FIG. 13 is specified. Further, the segmentalized getting-off place group q, which is connected to the specified segmentalized getting-in place group p, is specified based on the getting-in and off connection data. For example, the segmentalized getting-off place group q1 connected to the segmentalized getting-in place group p1 in FIG. 13 is specified. Based on the same getting-off place and same getting-off time zone data of the segmentalized getting-off place group q, the getting-off time zone and the getting-off place in the segmentalized getting-off place group q are obtained. The certain time in the obtained getting-off time zone, for example, the end time of the obtained getting-off time zone, provides an estimated getting-off time, at which the driver is to get off the vehicle after the driver is to get on the vehicle for the next driving. The obtained getting-off place provides an estimated getting-off place, at which the driver is to get off the vehicle after the driver is to get on the vehicle for the next driving.

Then, it goes to step S515. After step S512, step S515 and the following steps are executed as described above. Here, in step S530, the automatic charge controller 17h controls the route calculation unit 17c to calculate the guiding route from the current position as a starting point to the estimated getting-off place in step S512 as the destination. Then, based on the distance along with the guiding route between the current position and the destination and the like, the automatic charge controller 17h calculates a necessary charge amount, which is a necessary electric amount of the driving battery to be consumed for the next driving from the current position to the destination, i.e., the getting-off place.

In this case, based on the estimated getting-off time estimated in step S512, the necessary charge electric amount may be corrected. For example, when the estimated getting-off time estimated in step S512 is later than the arrival time to the getting-off place calculated by a conventional method according to the distance of the guiding route and the average driving speed, the necessary electric power may be corrected to increase. When the estimated getting-off time is earlier than the arrival time calculated by the conventional method, the necessary electric power may be corrected to decrease.

Thus, the automatic charge controller 17h specifies the current getting-off time, at which the controller 17 determines for the last time that the driver gets off the vehicle, and the current position of the vehicle, at which the vehicle is disposed at the current getting-off time. The segmentalized getting-off place group q representing the getting-off time zone and the getting-off place corresponding to the current getting-off time and the current position is specified. The segmentalized getting-in place group p, which is strongly connected to the specified segmentalized getting-off place group q, is determined based on the getting-in and off connection data. Further, the segmentalized getting-off place group q, which is strongly connected to the specified segmentalized getting-in place group p, is determined based on the getting-in and off connection data. The getting-off place corresponding to the specified segmentalized getting-off place group q is estimated as a place, at which the driver is to get off the vehicle after the driver is to get in the vehicle.

Thus, even if the destination is not set, the next getting-off place is estimated with high accuracy based on the getting-in and off connection data when the current getting-off time or the current position is detected. With using the estimated getting-off place, the charge control for charging the battery with an appropriate charge amount and the like are executed during a period between the current time and the next getting-in time.

For example, the driver drives frequently the vehicle to a certain facility, and a charge stand as a charge spot is disposed near the facility. The battery can be charged at a place near the home of the driver. The driver turns off the main power source of the vehicle, and charges the battery at the charge stand in a certain time zone B. Then, the driver turns on the main power source in the certain time zone B, and the driver returns to the home in a certain time zone C. The driver frequently performs these behaviors. Further, the charge cost per unit electricity at the charge stand is higher than the charge cost per unit electricity at home.

In this case, the segmentalized getting-off place group q1 representing the getting-off time zone A and the charge stand as the getting-off place is generated. Further, the segmentalized getting-in place group p1 representing the getting-in time zone B and the charge stand as the getting-in place is generated. Furthermore, the segmentalized getting-off place group q2 representing the getting-off time zone C and the home as the getting-off place is generated.

In the getting-in and off connection data, the segmentalized getting-off place group q1 is connected to the segmentalized getting-in place group p1, and the segmentalized getting-in place group p1 is connected to the segmentalized getting-off place group q2. Accordingly, when the destination is not set, the automatic charge controller 17h estimates the getting-off place, i.e., home in the segmentalized getting-off place group q2 as the next getting-off place in step S512. In step S530, the necessary charge amount for driving from the charge stand to the next getting-off place is calculated. In steps S535 and S540, the battery is charged to the necessary charge amount. Then, the charge is completed.

Figure 16:
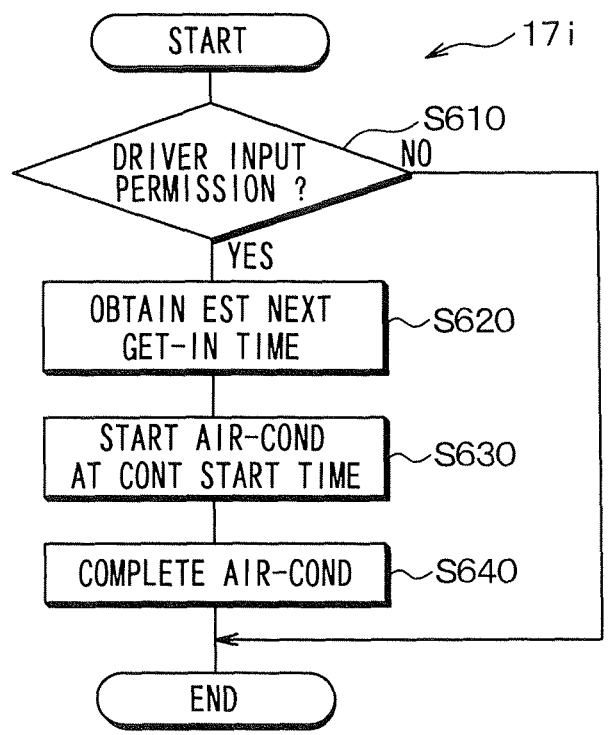
FIG. 16 is a flowchart showing a process in an automatic preliminary air-conditioning unit.

Next, the automatic preliminary air-conditioner 17i will be explained. The automatic preliminary air-conditioner 17i controls an in-vehicle air conditioner for a compartment of the vehicle to execute a preliminary air-conditioning process such that the air in the compartment is controlled before the driver gets in the vehicle. Accordingly, the automatic preliminary air-conditioner 17i executes a process in FIG. 16 when the main power source of the vehicle turns off. Alternatively, when a certain preliminary air-conditioning reservation operation is performed via the operation unit 13, the process in FIG. 16 is executed. The preliminary air-conditioning reservation operation is usually performed at a time when the driver gets off the vehicle. Accordingly, the preliminary air-conditioning reservation operation is one of the getting-off actions of the driver.

In step S610 of the process in FIG. 16, with using the image display 12 and/or the speaker 14, the automatic preliminary air-conditioner 17i ask the driver whether the preliminary air-conditioning process is executed. When the driver performs a permission operation with using the operation unit 13, it goes to step S620. When the driver performs a prohibition operation with using the operation unit 13, the process in FIG. 16 ends.

In step S620, the next getting-in time for the next driving is estimated. Specifically, the present getting-off time, at which the main power source of the vehicle turns off for the last time, and the getting-off place, at which the vehicle is disposed at the present getting-off time, are specified. Then, the segmentalized getting-off place group q corresponding to the present getting-off time and the getting-off place is specified. Further, the segmentalized getting-in place group p, which is connected to the specified segmentalized getting-off place group q, is determined based on the getting-in and off connection data. For example, the segmentalized getting-in place group p1 in FIG. 13 is specified to connect to the specified segmentalized getting-off place group q2. Based on the same getting-in place and time data of the determined segmentalized getting-in place group p, the getting-in time zone of the determined segmentalized getting-in place group p is obtained. The starting time or the average of the starting time and the end time of the getting-in time zone is defined as the estimated getting-in time.

In step S630, a control starting time is defined such that the control starting time is prior to the estimated getting-in time by a predetermined time interval $\Delta T$ such as 15 minutes. The automatic preliminary air-conditioner 17i stands by until the control starting time. At the control starting time, the automatic preliminary air-conditioner 17i controls the air-conditioner for the compartment to condition the air in the compartment.

In step S640, the automatic preliminary air-conditioner 17i continues to control the air-conditioner to condition the air until a predetermined condition is met. When the predetermined condition is met, the automatic preliminary air-conditioner 17i stops to control the air-conditioner. Thus, the air-conditioning ends. The predetermined condition is, for example, one of a condition that the controller 17 determines the getting-in action of the driver, a condition that the driver executes a cancel operation with using the operation unit 13, and a condition that predetermined time (e.g., one hour) has elapsed from the estimated getting-in time. Alternatively, the predetermined condition may be a combination of these three conditions.

Thus, the automatic preliminary air-conditioner 17i specifies the present getting-off time, at which the controller 17 determines the latest getting-off action, and the position of the vehicle at the present getting-off time. The automatic preliminary air-conditioner 17i specifies the segmentalized getting-off place group q corresponding to the getting-off time zone and the getting-off place, which include the present getting-off time and the position of the vehicle at the present getting-off time. Further, the automatic preliminary air-conditioner 17i determines the segmentalized getting-in place group p, which is strongly connected to the specified segmentalized getting-off place group q, based on the getting-in and off connection data. Based on the getting-in time zone of the determined segmentalized getting-in place group p, the automatic preliminary air-conditioner 17i estimates the next getting-in time, at which the driver is to get in the vehicle for the next driving event.

In this case, when the last getting-off time and getting-off place, at which the driver gets off the vehicle for the last time, are specified, the next getting-in time is estimated with high accuracy based on the getting-in and off connection data. With using the next getting-in time, the preliminary air-conditioning process and the like are executed until the next getting-in time.

Next, the cooling accumulation air-conditioning controller 17j will be explained. The cooling accumulation air-conditioning controller 17j preliminary estimates a getting-off time of the driver when the driver drives the vehicle. The cooling accumulation air-conditioning controller 17j defines a control starting time (i.e., an energy saving starting time) such that the control starting time is prior to the estimated getting-off time by a predetermined time interval, and the cooling accumulation air-conditioning controller 17j controls the air-conditioner to switch from a normal operation to an energy saving operation. Under the energy saving operation, the air-conditioner consumes electricity smaller than the normal operation. Thus, unnecessary electric power consumption is reduced.

Figure 17:
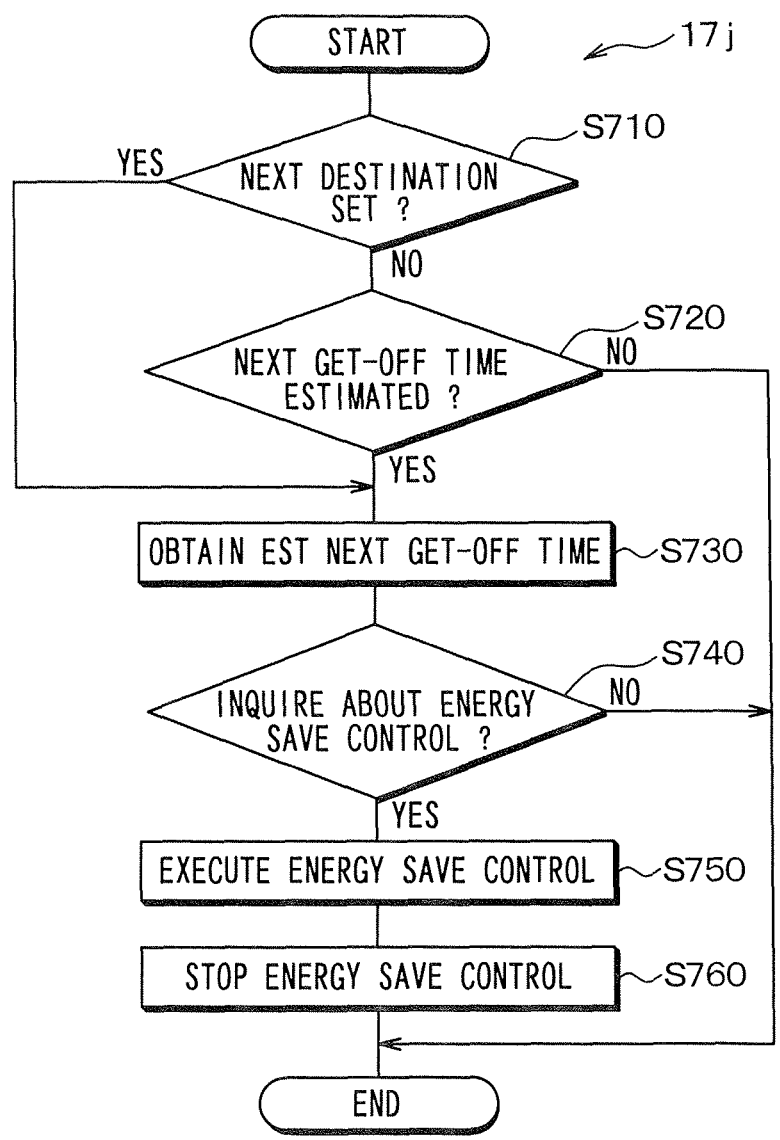
FIG. 17 is a flowchart showing a process in a cooling accumulation air-conditioning controller.

To realize the above operation, the cooling accumulation air-conditioning controller 17j starts to execute a process in FIG. 17 when the driver starts to drive the vehicle, i.e., when the vehicle starts to run.

When a destination and a guiding route to the destination are set by the route calculation unit 17c at the beginning time of the process, the cooling accumulation air-conditioning controller 17j determines in step S710 that the destination is set. Then, it goes to step S730. In step S730, the cooling accumulation air-conditioning controller 17j estimates the getting-off time, i.e., the arrival time of the destination, based on the current time, the current position and the guiding route.

Next, in step S740, the cooling accumulation air-conditioning controller 17j stands by until the energy saving starting time, which is prior to the estimated getting-off time by a predetermined time interval ΔT such as 15 minutes. At the energy saving starting time, the cooling accumulation air-conditioning controller 17j presents an inquiry to the driver with using the image display 12 and/or the speaker 14 whether the energy saving control of the air-conditioner is performed. When the driver inputs permission via the operation unit 13, it goes to step S750. When the driver inputs prohibition via the operation unit 13, the process in FIG. 17 ends.

In step S750, the cooling accumulation air-conditioning controller 17j controls the air-conditioner to operate an energy saving mode. Specifically, the cooling accumulation air-conditioning controller 17j controls the air-conditioner to stop the normal air-conditioning operation. Alternatively, the cooling accumulation air-conditioning controller 17j may control the air-conditioner to increase a set temperature of the compartment and to supply accumulated cool air to the compartment. Thus, the cooling accumulation air-conditioning controller 17j controls the air-conditioner to switch from the normal operation mode to an energy saving mode, in which the air-conditioner consumes electricity smaller than the normal operation mode.

In step S760, the cooling accumulation air-conditioning controller 17j continues to control the air-conditioner to operate in the energy saving mode until a predetermined condition is met. When the predetermined condition is met, the cooling accumulation air-conditioning controller 17j stops to control the air-conditioner in the energy saving mode. The predetermined condition is, for example, one of a condition that the driver changes a setting condition of the air-conditioner, a condition that the destination is changed, and a condition that predetermined time (e.g., one hour) has elapsed from the estimated getting-off time. Alternatively, the predetermined condition may be a combination of these three conditions.

The process in FIG. 17 in case where the destination and the guiding route to the destination are set by the route calculation unit 17c at the beginning time of the process is conventional. When the destination and the guiding route to the destination are not set by the route calculation unit 17c at the beginning time of the process, the process in FIG. 17 is new. In step S710, when the cooling accumulation air-conditioning controller 17j determines that the destination is not set, it goes to step S720.

In step S720, the cooling accumulation air-conditioning controller 17j specifies the current getting-in time, at which the main power source of the vehicle turns on for the last time, and the getting-in place, at which the vehicle is disposed at the current getting-in time. Then, the cooling accumulation air-conditioning controller 17j determines whether a condition is met so that the segmentalized getting-in place group p corresponding to the current getting-in time and the current getting-in place exists, and further, the existing segmentalized getting-in place group p is connected to one of segmentalized getting-off place groups q in the getting-in and off connection data.

When the condition is not met, the process in FIG. 17 ends. When the condition is met, it goes to step S730. In step S730, the one of the segmentalized getting-off place groups q connected to the existing segmentalized getting-in place group p is specified according to the getting-in and off connection data. For example, the segmentalized getting-off place group q1 connected to the segmentalized getting-in place group p1 is specified. Based on the same getting-off place and time data of the one of the segmentalized getting-off place groups q, the getting-off time zone and the getting-off place in the one of the segmentalized getting-off place groups q are obtained. The starting time or the average of the starting time and the end time of the getting-in time zone is defined as the estimated getting-in time. After step S730, step S740 and the following steps are executed as described above.

Thus, the cooling accumulation air-conditioning controller 17j specifies the latest getting-in time and the latest getting-in place, at which the controller 17j determines for the last time that the driver gets in the vehicle. The cooling accumulation air-conditioning controller 17j specifies the segmentalized getting-in place group corresponding to the getting-in time zone and the getting-in place, which include the latest getting-in time and the latest getting-in place. Further, the cooling accumulation air-conditioning controller 17j determines the segmentalized getting-off place group, which is connected to the specified segmentalized getting-in place group, according to the getting-in and off connection data. Based on the getting-off time zone of the determined segmentalized getting-off place group, the cooling accumulation air-conditioning controller 17j estimates the next getting-off time, at which the driver is to get off the vehicle for the next driving event.

Here, in step S740, the cooling accumulation air-conditioning controller 17j waits till the energy save starting time, which is prior to the estimated getting-off time by the predetermined time interval ΔT. Alternatively, the cooling accumulation air-conditioning controller 17j may stand by until the vehicle reaches a position within a predetermined distance (e.g., 1 kilometer) from the estimated getting-off place.

Thus, the specified segmentalized getting-in place group is connected to the segmentalized getting-off place group in the getting-in and off connection data. Thus, even if the destination is not set, when the latest getting-in time or the getting-in place, at which the cooling accumulation air-conditioning controller 17j detects the last getting-in action of the driver, are detected, the getting-off time and the getting-off place are estimated with high accuracy based on the getting-in and off connection data. Further, with using the estimated getting-off time and the estimated getting-off place, the energy saving control of the air-conditioner and the like are executed.

Other Embodiments

In the above embodiments, the method for determining whether the driver performs the getting-in action of the vehicle is to detect whether the main power source turns on. Alternatively, for example, the controller 17 may detect with using a door open/close sensor that a door of the vehicle on a driver side opens and closes, and further detect with using a seat sensor of a driver seat that the driver sits down on the driver seat, so that the controller 17 determines whether the driver performs the getting-in action of the vehicle.

In the above embodiments, the method for determining whether the driver performs the getting-off action of the vehicle is to detect whether the main power source turns off. Alternatively, for example, the controller 17 may detect with using the seat sensor of the driver seat that the sensor does not detect that the driver sits down on the driver seat, and then, detect with using the door open/close sensor that the door of the vehicle on the driver side opens and closes, so that the controller 17 determines whether the driver performs the getting-off action of the vehicle.

In step S220 of FIG. 8, the second threshold value as a threshold of the dispersion $\sigma^2$ is defined in retrieval time period 30. When the dispersion $\sigma^2$ is smaller than the second threshold value, the controller 17 determines that the getting-in time is concentrated in the time zone of the getting-in time distribution. Alternatively, a condition that the dispersion $\sigma^2$ is smaller than the second threshold value may not be necessary. Specifically, without depending on the dispersion $\sigma^2$, when the value obtained by dividing the total number of samples of the getting-in time 31 with the record period is equal to or larger than the predetermined first threshold value, the controller 17 may determine that the getting-in time is concentrated in the time zone of the getting-in time distribution.

The above second threshold value may be varied according to the time zone corresponding to the retrieval time period 30. For example, the variation of the getting-in time in the morning is smaller than the variation of the getting-in time at night. Thus, the second threshold in a case where the retrieval time period 30 is set in the morning may be smaller than the second threshold in a case where the retrieval time period 30 is set in the afternoon.

The above second threshold value in a case where the getting-in place group P is segmentalized may be different from the second threshold value in a case where the getting-off place group Q is segmentalized. For example, the variation of the getting-in time is smaller than the variation of the getting-off time. Accordingly, the second threshold value in a case where the getting-in place group P is segmentalized may be smaller than the second threshold value in a case where the getting-off place group Q is segmentalized.

In step S220 of FIG. 8, the normal distribution of the samples of the getting-in time (or the getting-off time) in the retrieval time period 30 is determined. Further, the average $\mu$ and the dispersion $\sigma^2$ of the estimated normal distribution are calculated. Alternatively, the normal distribution may not be estimated. For example, the average $\mu$ and the dispersion $\sigma^2$ may be directly calculated based on the samples of the getting-in time (or the getting-off time) in the retrieval time period 30.

The vehicle may be a conventional vehicle having only an internal combustion engine as a driving power source of the vehicle. Alternatively, the vehicle may be a hybrid vehicle so that the vehicle runs with the engine or a driving electric motor as a driving power source of the vehicle. Alternatively, the vehicle may be an electric vehicle having only an electric motor as a driving power source of the vehicle.

In step S110 of FIG. 5, the getting-in and off records to be read out may be stored within predetermined days such as 100 days. Specifically, the getting-in and off records are stored between the current day and the predetermined past days. In this case, the recording date of the getting-in and off record is specified by the date in the getting-in and off record.

In step S110, the upper limit of the number of the getting-in records to be read out may be different from the upper limit of the number of the getting-off records to be read out.

In the above embodiments, the time of the getting-in data and the time of the getting-off data stored in the driving history data do not include a date. Alternatively, the getting-in data and the getting-off data may include information of a business day and a holiday such Saturday, Sunday and a national holiday. Further, in step S220 of FIG. 8, the retrieval time period 30 may be set in 24 hours of the business day, and the other retrieval time period 30 may be set in 24 hours of the holiday. In this case, the segmentalized getting-in group p and the segmentalized getting-off group q are generated in each of the business day and the holiday. When the segmentalized getting-in group p, the segmentalized getting-off group q and the getting-in and off connection data for the business day are used, the habitual behavior of the driver on the business day is detected with high accuracy. When the segmentalized getting-in group p, the segmentalized getting-off group q and the getting-in and off connection data for the holiday are used, the habitual behavior of the driver on the holiday is detected with high accuracy.

In the above embodiments, the getting-in and off action estimation unit 17$f$ connects one of the segmentalized getting-in groups p to one of the segmentalized getting-off groups q, and further connects one of the segmentalized getting-off groups q to one of the segmentalized getting-in groups p. Thus, the getting-in and off action estimation unit 17$f$ connects both ways. Alternatively, the getting-in and off action estimation unit 17$f$ may connect one way.

For example, the getting-in and off action estimation unit 17$f$ may only connect one of the segmentalized getting-in groups p to one of the segmentalized getting-off groups q. In this case, the necessary information for operating the energy estimation monitor 17$g$ or the cooling accumulation air-conditioning controller 17$j$ is stored. Alternatively, the getting-in and off action estimation unit 17$f$ may only connect one of the segmentalized getting-off groups q to one of the segmentalized getting-in groups p. In this case, the necessary information for operating the automatic preliminary air-conditioner 17$i$ is stored.

In the above embodiments, the apparatus for connecting the getting-in record and the getting-off record of the vehicle is the navigation device 1. Alternatively, the apparatus for connecting the getting-in record and the getting-off record of the vehicle may be different from the navigation device 1.

In the above embodiments, each function executed by a program in the controller 17 may be performed by hardware. For example, a FPGA capable of programming a circuit construction may provide each function of the controller 17.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An apparatus for connecting a getting-in record and a getting-off record of a vehicle comprising:
   a driving information memory unit for storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected;
   a grouping unit for grouping the getting-in records, which represent a same getting-in time zone and a same getting-in place, so that one or more segmentalized getting-in groups are generated, and for grouping the getting-off records, which represent a same getting-off time zone and a same getting-off place, so that one or more segmentalized getting-off groups are generated;

a connecting unit for searching a segmentalized getting-in group, which is connected to each of the one or more segmentalized getting-off groups, and for storing connection information in a getting-in and off connection data, wherein the connection information represents a connection between a searched segmentalized getting-in group and a respective segmentalized getting-off group, the connection unit searches the segmentalized getting-in group in such a manner that the connection unit specifies one segmentalized getting-in group representing a getting-in record, which is stored in the driving history data next to each getting-off record of a respective segmentalized getting-off group, and determines the one segmentalized getting-in group, which is connected to the respective segmentalized getting-off group, when the number of times that the one segmentalized getting-in group is specified is equal to or larger than predetermined times; and an estimating unit for specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time, wherein the connecting unit searches a segmentalized getting-off group, which is connected to each of the one or more segmentalized getting-in groups, wherein the connecting unit stores another connection information in the getting-in and off connection data, wherein the another connection information represents a connection between a searched segmentalized getting-off group and a respective segmentalized getting-in group, wherein the connection unit searches the segmentalized getting-off group in such a manner that the connection unit specifies one segmentalized getting-off group representing a getting-off record, which is stored in the driving history data as a pair of each getting-in record of a respective segmentalized getting-in group, and determines the one segmentalized getting-off group, which is connected to the respective segmentalized getting-in group, when the number of times that the one segmentalized getting-off group is specified is equal to or larger than predetermined times, wherein the estimating unit specifies a getting-in time and a getting-in point when the getting-in action of the driver is detected for the last time, wherein the estimating unit specifies a segmentalized getting-in group, which represents a getting-in time zone and a getting-in place corresponding to a specified getting-in time and a specified getting-in point, wherein the estimating unit determines a segmentalized getting-off group, which is connected to a specified segmentalized getting-in group, based on the getting-in and off connection data, and wherein the estimating unit estimates a getting-off time, at which the driver is to get off the vehicle for the next time, according to a getting-off time zone of a determined segmentalized getting-off group or estimates a getting-off place, at which the driver is to get off the vehicle for the next time, according to a getting-off place of the determined segmentalized getting-off.

2. The apparatus according to claim 1, wherein the estimating unit specifies a getting-off time and a getting-off point when the getting-off action of the driver is detected for the last time, wherein the estimating unit specifies a segmentalized getting-off group, which represents a getting-off time zone and a getting-off place corresponding to a specified getting-off time and a specified getting-off point, wherein the estimating unit determines a segmentalized getting-in group, which is connected to a specified segmentalized getting-off group, based on the getting-in and off connection data, wherein the estimating unit determines a segmentalized getting-off group, which is connected to a determined segmentalized getting-in group, based on the getting-in and off connection data, and wherein the estimating unit estimates a getting-off time, at which the driver is to get off the vehicle for the next time, according to a getting-off time zone of a determined segmentalized getting-off group or estimates a getting-off place, at which the driver is to get off the vehicle for the next time, according to a getting-off place of the determined segmentalized getting-off.

3. An apparatus for connecting a getting-in record and a getting-off record of a vehicle comprising:

a driving information memory unit for storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected;

a grouping unit for grouping the getting-in records, which represent a same getting-in time zone and a same getting-in place, so that one or more segmentalized getting-in groups are generated, and for grouping the getting-off records, which represent a same getting-off time zone and a same getting-off place, so that one or more segmentalized getting-off groups are generated;

a connecting unit for searching a segmentalized getting-in group, which is connected to each of the one or more segmentalized getting-off groups, and for storing connection information in a getting-in and off connection data, wherein the connection information represents a connection between a searched segmentalized getting-in group and a respective segmentalized getting-off group, the connection unit searches the segmentalized getting-in group in such a manner that the connection unit specifies one segmentalized getting-in group representing a getting-in record, which is stored in the driving history data next to each getting-off record of a respective segmentalized getting-off group, and determines the one segmentalized getting-in group, which is connected to the respective segmentalized getting-off group, when the number of times that the one segmentalized getting-in group is specified is equal to or larger than predetermined times; and an estimating unit for specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time, wherein the grouping unit includes a first grouping unit and a second grouping unit, wherein the first grouping unit groups the getting-in records, which represent a same getting-in place, so that one or more same getting-in place groups are generated, wherein the first grouping unit groups the getting-off records, which represent a same getting-off place, so that one or more same getting-off place groups are generated, wherein the second grouping unit groups the getting-in records in each of the one or more same getting-in place groups, which represent a same getting-in time, so that one or more segmentalized getting-in groups are generated, wherein the second grouping unit groups the getting-off records in each of the one or more same getting-off place groups, which represent a same getting-off time, so that one or more segmentalized getting-off groups are generated, wherein the first grouping unit generates one same getting-in place group in such a manner that the first grouping unit reads out the getting-in records from the driving history data, defines a set of getting-in records, each of which represents the same getting-in place, and determines the set of getting-in records to be the same getting-in place group when a ratio between the number of getting-in records in the set of getting-in records and a total number of getting-in records read out from the driving history data is equal to or larger than a predetermined ratio, and wherein the first grouping unit generates one same getting-off place group in such a manner that the first grouping unit reads out the getting-off records from the driving history data, defines a set of getting-off records, each of which represents the same getting-off place, and determines the set of getting-off records to be the same getting-off place group when a ratio between the number of getting-off records in the set of getting-off records and a total number of getting-off records read out from the driving history data is equal to or larger than another predetermined ratio.

4. The apparatus according to claim 3, wherein the second grouping unit generates one segmentalized getting-in group in such a manner that the second grouping unit retrieves a time zone, in which a distribution of the getting-in time of the getting-in records in one same getting-in place group is concentrated, defines a set of getting-in records in the one same getting-in place group, each of which represents the getting-in time in a retrieved time zone, and determines the set of getting-in records to be the one segmentalized getting-in group, wherein the second grouping unit generates one segmentalized getting-off group in such a manner that the second grouping unit retrieves another time zone, in which a distribution of the getting-off time of the getting-off records in one same getting-off place group is concentrated, defines a set of getting-off records in the one same getting-off place group, each of which represents the getting-off time in another retrieved time zone, and determines the set of getting-off records to be the one segmentalized getting-off group, wherein the second grouping unit retrieves the time zone in such a manner that the second grouping unit specifies a recording period, in which the getting-in records and the getting-off records are recorded in the driving information memory unit, defines a predetermined retrieval period in the recording period, and determines the time zone in the retrieval period when a ratio between the number of getting-in records representing the getting-in time in the retrieval period and the number of getting-in records in the recording period is equal to or larger than a threshold ratio, and wherein the second grouping unit retrieves the another time zone in such a manner that the second grouping unit defines another predetermined retrieval period in the recording period, and determines the another time zone in the retrieval period when a ratio between the number of getting-off records representing the getting-off time in the another retrieval period and the number of getting-off records in the recording period is equal to or larger than another threshold ratio.

5. A method for connecting a getting-in record and a getting-off record of a vehicle comprising:

storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected;

grouping the getting-in records, which represent a same getting-in time zone and a same getting-in place, so that one or more segmentalized getting-in groups are generated, and grouping the getting-off records, which represent a same getting-off time zone and a same getting-off place, so that one or more segmentalized getting-off groups are generated;

searching a segmentalized getting-in group, which is connected to each of the one or more segmentalized getting-off groups, and storing connection information in a getting-in and off connection data, wherein the connection information represents a connection between a searched segmentalized getting-in group and a respective segmentalized getting-off group, the searching of the segmentalized getting-in group includes: specifying one segmentalized getting-in group representing a getting-in record, which is stored in the driving history data next to each getting-off record of a respective segmentalized getting-off group; and determining the one segmentalized getting-in group, which is connected to the respective segmentalized getting-off group, when the number of times that the one segmentalized getting-in group is specified is equal to or larger than predetermined times;

specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time;

searching a segmentalized getting-off group, which is connected to each of the one or more segmentalized getting-in groups;

storing another connection information in the getting-in and off connection data;

wherein the another connection information represents a connection between a searched segmentalized getting-off group and a respective segmentalized getting-in group, wherein the searching of the segmentalized getting-off group includes specifying one segmentalized getting-off group representing a getting-off record, which is stored in the driving history data as a pair of each getting-in record of a respective segmentalized getting-in group, and determining the one segmentalized getting-off group, which is connected to the respective segmentalized getting-in group, when the number of times that the one segmentalized getting-off group is specified is equal to or larger than predetermined times, specifying a getting-in time and a getting-in point when the getting-in action of the driver is detected for the last time;

specifying a segmentalized getting-in group, which represents a getting-in time zone and a getting-in place corresponding to a specified getting-in time and a specified getting-in point;

determining a segmentalized getting-off group, which is connected to a specified segmentalized getting-in group, based on the getting-in and off connection data; and estimating a getting-off time, at which the driver is to get off the vehicle for the next time, according to a getting-off time zone of a determined segmentalized getting-off group or estimates a getting-off place, at which the driver is to get off the vehicle for the next time, according to a getting-off place of the determined segmentalized getting-off.

6. A program product stored in a non-transitory computer readable storage medium comprising instructions for execution by a computer, the instructions including the method for connecting the getting-in record and the getting-off record of the vehicle according to claim 5, the method being computer-implemented.

7. A program product stored in a non-transitory computer-readable media comprising instructions for execution by a computer, the instructions enabling the computer to function as the driving information memory unit, the grouping unit, the connecting unit and the estimating unit included in the apparatus according to claim 1.

8. A method for connecting a getting-in record and a getting-off record of a vehicle comprising:

storing a plurality of getting-in and off records in a driving history data in a chronological order, wherein each getting-in and off record includes a pair of a getting-in record and a getting-off record, the getting-in record represents a getting-in time and a getting-in place, at which a getting-in action of a driver is detected, and the getting-off record represents a getting-off time and a getting-off place, at which a getting-off action of the driver is detected;

grouping the getting-in records, which represent a same getting-in time zone and a same getting-in place, so that one or more segmentalized getting-in groups are generated, and grouping the getting-off records, which represent a same getting-off time zone and a same getting-off place, so that one or more segmentalized getting-off groups are generated;

searching a segmentalized getting-in group, which is connected to each of the one or more segmentalized getting-off groups, and storing connection information in a getting-in and off connection data, wherein the connection information represents a connection between a searched segmentalized getting-in group and a respective segmentalized getting-off group, the searching of the segmentalized getting-in group includes: specifying one segmentalized getting-in group representing a getting-in record, which is stored in the driving history data next to each getting-off record of a respective segmentalized getting-off group; and determining the one segmentalized getting-in group, which is connected to the respective segmentalized getting-off group, when the number of times that the one segmentalized getting-in group is specified is equal to or larger than predetermined times;

specifying a getting-off time and a getting-off point when the getting-off action of the driver is detected, specifying a segmentalized getting-off group, which represents a getting-off time zone and a getting-off place corresponding to a specified getting-off time and a specified getting-off point, determining a segmentalized getting-in group, which is connected to a specified segmentalized getting-off group, based on the getting-in and off connection data, and estimating a getting-in time for a next driving of the driver according to a getting-in time zone of a determined segmentalized getting-in group when the driver gets off the vehicle at a present time;

wherein the grouping of the getting-in records grouping the getting-in records, which represent a same getting-in place, so that one or more same getting-in place groups are generated, grouping the getting-off records, which represent a same getting-off place, so that one or more same getting-off place groups are generated, grouping the getting-in records in each of the one or more same getting-in place groups, which represent a same getting-in time, so that one or more segmentalized getting-in groups are generated, grouping the getting-off records in each of the one or more same getting-off place groups, which represent a same getting-off time, so that one or more segmentalized getting-off groups are generated, generating one same getting-in place group by reading out the getting-in records from the driving history data, defining a set of getting-in records, each of which represents the same getting-in place, and determining the set of getting-in records to be the same getting-in place group when a ratio between the number of getting-in records in the set of getting-in records and a total number of getting-in records read out from the driving history data is equal to or larger than a predetermined ratio, and generating one same getting-off place group by reading out the getting-off records from the driving history data, defining a set of getting-off records, each of which represents the same getting-off place, and determining the set of getting-off records to be the same getting-off place group when a ratio between the number of getting-off records in the set of getting-off records and a total number of getting-off records read out from the driving history data is equal to or larger than another predetermined ratio.

* * * * *